United States Patent
Zhong et al.

(10) Patent No.: US 10,437,631 B2
(45) Date of Patent: Oct. 8, 2019

(54) OPERATING SYSTEM HOT-SWITCHING METHOD AND APPARATUS AND MOBILE TERMINAL

(71) Applicant: Huawei Technologies Co., Ltd., Shenzhen (CN)

(72) Inventors: Jianfei Zhong, Hangzhou (CN); Bo Lu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 15/620,291

(22) Filed: Jun. 12, 2017

(65) Prior Publication Data

US 2017/0277561 A1   Sep. 28, 2017

Related U.S. Application Data

(63) Continuation of application No. PCT/CN2015/082859, filed on Jun. 30, 2015.

(30) Foreign Application Priority Data

Dec. 12, 2014   (CN) .......................... 2014 1 0767954

(51) Int. Cl.
   *G06F 9/44*   (2018.01)
   *G06F 9/48*   (2006.01)
   (Continued)

(52) U.S. Cl.
   CPC .............. *G06F 9/48* (2013.01); *G06F 9/441* (2013.01); *G06F 9/4413* (2013.01); *G06F 9/5044* (2013.01); *G06F 9/542* (2013.01)

(58) Field of Classification Search
   None
   See application file for complete search history.

(56) References Cited

U.S. PATENT DOCUMENTS

2008/0077917 A1\*   3/2008   Chen .................. G06F 9/45558
                                                        718/1
2008/0177905 A1\*   7/2008   Ohta .................. G06F 9/45533
                                                        710/14
(Continued)

FOREIGN PATENT DOCUMENTS

CN   101226489 A   7/2008
CN   101620471 A   1/2010
(Continued)

OTHER PUBLICATIONS

Machine Translation and Abstract of Korean Publication No. KR20130022095, Mar. 6, 2013, 10 pages.
(Continued)

*Primary Examiner* — Shih-Wei Kraft
(74) *Attorney, Agent, or Firm* — Conley Rose, P.C.

(57) ABSTRACT

An operating system hot-switching method, applied to a mobile terminal running multiple operating systems, where the multiple operating systems include one foreground operating system and at least one background operating system, a current foreground operating system is a first operating system. The method includes obtaining an operating system switching instruction, where the operating system switching instruction includes an identifier of the second operating system and a switching identifier, releasing, according to the switching identifier, a hardware resource occupied by the first operating system, and switching the foreground operating system from the first operating system to the second operating system. Hence, the operating system hot-switching method ensures, to some extent, mutually exclusive access to and coordinated use of a hardware resource by multiple operating systems, thereby ensuring use reliability of the hardware resource after switching of an operating system.

5 Claims, 12 Drawing Sheets

(51) Int. Cl.
*G06F 9/50* (2006.01)
*G06F 9/54* (2006.01)
*G06F 9/4401* (2018.01)

(56) References Cited

U.S. PATENT DOCUMENTS

| | | |
|---|---|---|
| 2008/0184274 A1 | 7/2008 | Ohta et al. |
| 2009/0113458 A1 | 4/2009 | Finger et al. |
| 2010/0122077 A1 | 5/2010 | Durham |
| 2011/0271088 A1 | 11/2011 | Princen et al. |
| 2012/0084481 A1 | 4/2012 | Reeves et al. |
| 2012/0159144 A1 | 6/2012 | Sengupta et al. |
| 2012/0226925 A1 | 9/2012 | Wang et al. |
| 2013/0054955 A1 | 2/2013 | Oh et al. |
| 2013/0227270 A1 | 8/2013 | Ting |
| 2013/0247065 A1 | 9/2013 | Lee et al. |
| 2015/0254086 A1* | 9/2015 | Nakajima ........... G06F 9/45533 718/1 |

FOREIGN PATENT DOCUMENTS

| | | |
|---|---|---|
| CN | 102135910 A | 7/2011 |
| CN | 102420911 A | 4/2012 |
| CN | 102638728 A | 8/2012 |
| CN | 103294545 A | 9/2013 |
| CN | 103294970 A | 9/2013 |
| CN | 103309737 A | 9/2013 |
| CN | 103425520 A | 12/2013 |
| CN | 103744729 A | 4/2014 |
| CN | 104516760 A | 4/2015 |
| KR | 20130022095 A | 3/2013 |
| KR | 20130104958 A | 9/2013 |
| WO | 2013101139 A1 | 7/2013 |

OTHER PUBLICATIONS

Foreign Communication From a Counterpart Application, Korean Application No. 10-2017-7019225, Korean Office Action dated Mar. 15, 2018, 8 pages.
Foreign Communication From a Counterpart Application, Korean Application No. 10-2017-7019225, English Translation of Korean Office Action dated Mar. 15, 2018, 7 pages.
Foreign Communication From a Counterpart Application, European Application No. 15866553.9, Extended European Search Report dated Nov. 6, 2017, 11 pages.
Machine Translation and Abstract of Chinese Publication No. CN101620471, Jan. 6, 2010, 5 pages.
Machine Translation and Abstract of Chinese Publication No. CN102420911, Apr. 18, 2012, 6 pages.
Machine Translation and Abstract of Chinese Publication No. CN102638728, Aug. 15, 2012, 7 pages.
Machine Translation and Abstract of Chinese Publication No. CN103309737, Sep. 18, 2013, 9 pages.
Machine Translation and Abstract of Chinese Publication No. CN103425520, Dec. 4, 2013, 9 pages.
Machine Translation and Abstract of Chinese Publication No. CN103744729, Apr. 23, 2014, 9 pages.
Machine Translation and Abstract of Chinese Publication No. CN104516760, Apr. 15, 2015, 32 pages.
Foreign Communication From a Counterpart Application, PCT Application No. PCT/CN2015/082859, English Translation of International Search Report dated Sep. 28, 2015, 2 pages.
Foreign Communication From a Counterpart Application, PCT Application No. PCT/CN2015/082859, English Translation of Written Opinion dated Sep. 28, 2015, 7 pages.

\* cited by examiner

OPERATING SYSTEM HOT-SWITCHING METHOD AND APPARATUS AND MOBILE TERMINAL

CROSS-REFERENCE TO RELATED APPLICATIONS

This application is a continuation of International Patent Application No. PCT/CN2015/082859 filed on Jun. 30, 2015, which claims priority to Chinese Patent Application No. 201410767954.5 filed on Dec. 12, 2014. The disclosures of the aforementioned applications are hereby incorporated by reference in their entireties.

TECHNICAL FIELD

The present disclosure relates to the field of computer technologies, and in particular, to an operating system hot-switching method and apparatus, and a mobile terminal.

BACKGROUND

As a current mobile terminal has increasingly powerful functions and supports more functions, one mobile terminal can run multiple operating systems. However, the mobile terminal can be exclusively used by only one operating system at a time. Therefore, a current operating system switching manner is a multi-system cold switching. That is, only one operating system can be started at a time, and if another operating system needs to be switched to, the mobile terminal needs to be restarted. If multiple operating systems can be simultaneously started, and quick hot-switching can be performed between two operating systems, value and user experience of the multiple operating systems can be improved to a new level, and more users can be attracted.

One mobile terminal has only one set of hardware resources. The hardware resources are hardware resources in the mobile terminal that are used for external interaction, such as a display screen, audio and video, BLUETOOTH, WI-FI, a Global Positioning System (GPS), a Universal Serial Bus (USB), and a secure digital (SD) card. Currently, in a mobile terminal running multiple operating systems, a case in which the multiple operating systems simultaneously use a same hardware resource frequently occurs, which causes abnormal use of or even damage to the hardware resource. In other approaches, mutually exclusive access to and coordinated use of a hardware resource in a mobile terminal cannot be implemented among multiple operating systems.

SUMMARY

Embodiments of the present disclosure provide an operating system hot-switching method, which can ensure, to some extent, mutually exclusive access to and coordinated use of a hardware resource by multiple operating systems, thereby ensuring use reliability of the hardware resource after switching of an operating system. The embodiments of the present disclosure further provide a corresponding apparatus, and a mobile terminal.

A first aspect of the present disclosure provides an operating system hot-switching method, where the method is applied to a mobile terminal running multiple operating systems, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, the at least one background operating system includes a second operating system, and the method includes obtaining an operating system switching instruction, where the operating system switching instruction includes an identifier of the second operating system and a switching identifier, and the identifier of the second operating system is used to instruct to switch the second operating system to the foreground operating system, releasing, according to the switching identifier, a hardware resource occupied by the first operating system, where the hardware resource is a hardware resource that is in the mobile terminal and that is used for external interaction, and modifying running status information in a resource management namespace of the first operating system to a background state, modifying running status information in a resource management namespace of the second operating system to a foreground state, and completing switching of the foreground operating system from the first operating system to the second operating system.

With reference to the first aspect, in a first possible implementation manner, after releasing, according to the switching identifier, the hardware resource occupied by the first operating system, where the hardware resource is a hardware resource that is in the mobile terminal and that is used for external interaction, the method further includes determining, from a global resource linked list, the resource management namespace of the second operating system according to the identifier of the second operating system, where the global resource linked list includes a correspondence between an identifier of an operating system and a resource management namespace of the operating system.

With reference to the first aspect or the first possible implementation manner of the first aspect, in a second possible implementation manner, releasing, according to the switching identifier, the hardware resource occupied by the first operating system includes unblocking, according to the switching identifier, a blocking state of a switching start identifier in the blocking state to obtain an unblocked switching start identifier, where the unblocked switching start identifier is used to instruct a resource management thread to notify the hardware in the mobile terminal to release the hardware resource occupied by the first operating system, and the switching start identifier in the blocking state is used to instruct to forbid execution of operating system switching.

With reference to the second possible implementation manner of the first aspect, in a third possible implementation manner, after completing switching of the foreground operating system from the first operating system to the second operating system, the method further includes allocating the hardware resource to the second operating system for use, and restoring the unblocked switching start identifier to the blocking state after allocating the hardware resource to the second operating system for use.

With reference to the first aspect or the first, the second, or the third possible implementation manner of the first aspect, in a fourth possible implementation manner, after completing switching of the foreground operating system from the first operating system to the second operating system, the method further includes monitoring a hot-swap interface of the mobile terminal, and when a first hot-swap device is removed from the mobile terminal, clearing an in-position mark of the first hot-swap device from the resource management namespace of the first operating system in order to unbind a binding relationship between the first hot-swap device and the first operating system, where the in-position mark of the first hot-swap device is used to indicate that the first hot-swap device is used by the first operating system.

With reference to the first aspect or the first, the second, the third, or the fourth possible implementation manner of the first aspect, in a fifth possible implementation manner, after completing switching of the foreground operating system from the first operating system to the second operating system, the method further includes monitoring the hot-swap interface of the mobile terminal, and when a second hot-swap device is inserted into the mobile terminal, adding an in-position mark of the second hot-swap device to the resource management namespace of the second operating system in order to establish a binding relationship between the second hot-swap device and the second operating system, where the in-position mark of the second hot-swap device is used to indicate that the second hot-swap device is used by the second operating system.

A second aspect of the present disclosure provides a hot-swap device management method, where the method is applied to a mobile terminal running multiple operating systems, the mobile terminal provides a hot-swap interface, hot swapping is implemented between a hot-swap device and the mobile terminal using the hot-swap interface, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, the at least one background operating system includes a second operating system, and the method includes monitoring the hot-swap interface of the mobile terminal, when a first hot-swap device is inserted into the mobile terminal, adding an in-position mark of the first hot-swap device to a resource management namespace of the first operating system in order to establish a binding relationship between the first hot-swap device and the first operating system, where the in-position mark of the first hot-swap device is used to indicate that the first hot-swap device is used by the first operating system, and when a second hot-swap device is removed from the mobile terminal, clearing an in-position mark of the second hot-swap device from the resource management namespace of the first operating system in order to unbind a binding relationship between the second hot-swap device and the first operating system, where the in-position mark of the second hot-swap device is used to indicate that the second hot-swap device is used by the first operating system.

With reference to the second aspect, in a first possible implementation manner, after the foreground operating system is switched from the first operating system to the second operating system, the method further includes clearing the in-position mark of the first hot-swap device from the resource management namespace of the first operating system in order to unbind the binding relationship between the first hot-swap device and the first operating system when the first hot-swap device is removed from the mobile terminal, where the in-position mark of the first hot-swap device is used to indicate that the first hot-swap device is used by the first operating system, and adding the in-position mark of the second hot-swap device to a resource management namespace of the second operating system in order to establish a binding relationship between the second hot-swap device and the second operating system when the second hot-swap device is inserted into the mobile terminal, where the in-position mark of the second hot-swap device is used to indicate that the second hot-swap device is used by the second operating system.

A third aspect of the present disclosure provides an operating system hot-switching apparatus, where the apparatus is applied to a mobile terminal running multiple operating systems, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, the at least one background operating system includes a second operating system, and the apparatus includes an obtaining unit configured to obtain an operating system switching instruction, where the operating system switching instruction includes an identifier of the second operating system and a switching identifier, and the identifier of the second operating system is used to instruct to switch the second operating system to the foreground operating system, a releasing unit configured to release, according to the switching identifier obtained by the obtaining unit, a hardware resource occupied by the first operating system, where the hardware resource is a hardware resource that is in the mobile terminal and that is used for external interaction, and after the releasing unit releases the hardware resource, a switching unit configured to modify running status information in a resource management namespace of the first operating system to a background state, modify running status information in a resource management namespace of the second operating system to a foreground state, and complete switching of the foreground operating system from the first operating system to the second operating system.

With reference to the third aspect, in a first possible implementation manner, the apparatus further includes a determining unit configured to determine, from a global resource linked list, the resource management namespace of the second operating system according to the identifier that is of the second operating system and is obtained by the obtaining unit, where the global resource linked list includes a correspondence between an identifier of an operating system and a resource management namespace of the operating system.

With reference to the third aspect or the first possible implementation manner of the third aspect, in a second possible implementation manner, the releasing unit is further configured to unblock, according to the switching identifier, a blocking state of a switching start identifier in the blocking state to obtain an unblocked switching start identifier, where the unblocked switching start identifier is used to instruct a resource management thread to notify the hardware in the mobile terminal to release the hardware resource occupied by the first operating system, and the switching start identifier in the blocking state is used to instruct to forbid execution of operating system switching.

With reference to the second possible implementation manner of the third aspect, in a third possible implementation manner, the apparatus further includes an allocation unit configured to allocate the hardware resource to the second operating system for use after the switching unit completes switching of the foreground operating system from the first operating system to the second operating system, and a modification unit configured to restore the unblocked switching start identifier to the blocking state after the allocation unit allocates the hardware resource to the second operating system for use.

With reference to the third aspect or the first, the second, or the third possible implementation manner of the third aspect, in a fourth possible implementation manner, the apparatus further includes a first monitoring unit configured to monitor a hot-swap interface of the mobile terminal after the switching unit completes switching of the foreground operating system from the first operating system to the second operating system, and a clearing unit configured to clear an in-position mark of the first hot-swap device from the resource management namespace of the first operating system in order to unbind a binding relationship between the first hot-swap device and the first operating system when a first monitoring unit monitors that the first hot-swap device is removed from the mobile terminal, where the in-position mark of the first hot-swap device is used to indicate that the first hot-swap device is used by the first operating system.

With reference to the third aspect or the first, the second, the third, or the fourth possible implementation manner of the third aspect, in a fifth possible implementation manner, the apparatus further includes a second monitoring unit configured to monitor the hot-swap interface of the mobile terminal, and an adding unit configured to add an in-position mark of the second hot-swap device to the resource management namespace of the second operating system in order to establish a binding relationship between the second hot-swap device and the second operating system when the second monitoring unit monitors that a second hot-swap device is inserted into the mobile terminal, where the in-position mark of the second hot-swap device is used to indicate that the second hot-swap device is used by the second operating system.

A fourth aspect of the present disclosure provides a hot-swap device management apparatus, where the apparatus is applied to a mobile terminal running multiple operating systems, the mobile terminal provides a hot-swap interface, hot swapping is implemented between a hot-swap device and the mobile terminal using the hot-swap interface, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, the at least one background operating system includes a second operating system, and the apparatus includes a monitoring unit configured to monitor the hot-swap interface of the mobile terminal, an adding unit configured to add an in-position mark of the first hot-swap device to a resource management namespace of the first operating system in order to establish a binding relationship between the first hot-swap device and the first operating system when the monitoring unit monitors that a first hot-swap device is inserted into the mobile terminal, where the in-position mark of the first hot-swap device is used to indicate that the first hot-swap device is used by the first operating system, and a clearing unit configured to clear an in-position mark of the second hot-swap device from the resource management namespace of the first operating system in order to unbind a binding relationship between the second hot-swap device and the first operating system when the monitoring unit monitors that a second hot-swap device is removed from the mobile terminal, where the in-position mark of the second hot-swap device is used to indicate that the second hot-swap device is used by the first operating system.

With reference to the fourth aspect, in a first possible implementation manner, the clearing unit is further configured to clear the in-position mark of the first hot-swap device from the resource management namespace of the first operating system in order to unbind the binding relationship between the first hot-swap device and the first operating system after the foreground operating system is switched from the first operating system to the second operating system, when the monitoring unit monitors that the first hot-swap device is removed from the mobile terminal, where the in-position mark of the first hot-swap device is used to indicate that the first hot-swap device is used by the first operating system, and the adding unit is further configured to add the in-position mark of the second hot-swap device to a resource management namespace of the second operating system in order to establish a binding relationship between the second hot-swap device and the second operating system after the foreground operating system is switched from the first operating system to the second operating system, when the monitoring unit monitors that the second hot-swap device is inserted into the mobile terminal, where the in-position mark of the second hot-swap device is used to indicate that the second hot-swap device is used by the second operating system.

A fifth aspect of the present disclosure provides a mobile terminal, where the mobile terminal includes a processor, a memory, and a hardware resource, the hardware resource is a hardware resource that is in the mobile terminal and that is used for external interaction, the processor simultaneously runs multiple operating systems, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system, and the processor is configured to obtain an operating system switching instruction, where the operating system switching instruction includes an identifier of the second operating system and a switching identifier, and the identifier of the second operating system is used to instruct to switch the second operating system to the foreground operating system, release, according to the switching identifier, the hardware resource occupied by the first operating system, modify running status information in a resource management namespace of the first operating system to a background state, modify running status information in a resource management namespace of the second operating system to a foreground state, and complete switching of the foreground operating system from the first operating system to the second operating system.

A sixth aspect of the present disclosure provides a mobile terminal, where the mobile terminal includes a processor, a memory, a hardware resource, and a hot-swap interface, the hardware resource is a hardware resource that is in the mobile terminal and that is used for external interaction, hot swapping is implemented between a hot-swap device and the mobile terminal using the hot-swap interface, the processor simultaneously runs multiple operating systems, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system, and the processor is configured to monitor the hot-swap interface of the mobile terminal, add an in-position mark of the first hot-swap device to a resource management namespace of the first operating system in order to establish a binding relationship between the first hot-swap device and the first operating system when a first hot-swap device is inserted into the mobile terminal, where the in-position mark of the first hot-swap device is used to indicate that the first hot-swap device is used by the first operating system, and clear an in-position mark of the second hot-swap device from the resource management namespace of the first operating system in order to unbind a binding relationship between the second hot-swap device and the first operating system when a second hot-swap device is removed from the mobile terminal, where the in-position mark of the second hot-swap device is used to indicate that the second hot-swap device is used by the first operating system.

The operating system hot-switching method provided in the embodiments of the present disclosure is applied to a mobile terminal running multiple operating systems. The multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system. The method includes obtaining an operating system switching instruction, where the operating system switching instruction includes an identifier of the second operating system and a switching identifier, and the identifier of the second operating system is used to instruct to switch the second operating system to the foreground operating system, releasing, according to the switching identifier, a hardware resource occupied by the first operating system, where the hardware resource is a hardware resource that is in the mobile terminal and that is used for external interaction, and modifying running status information in a resource management namespace of the first operating system to a background state, modifying running status information in a resource management namespace of the second operating system to a foreground state, and completing switching of the foreground operating system from the first operating system to the second operating system. In other approaches, a case in which multiple operating systems simultaneously use a same hardware resource frequently occurs, which causes abnormal use of the hardware resource. In comparison, according to the operating system hot-switching method provided in the embodiments of the present disclosure, when operating system hot-switching is performed, a hardware resource occupied by a current foreground operating system may be first released, and the hardware resource is instructed, using running status information in a resource management namespace in order to shield access to the hardware resource by a background operating system, which ensures, to some extent, mutually exclusive access to and coordinated use of the hardware resource by multiple operating systems, thereby ensuring use reliability of the hardware resource after switching of an operating system.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The embodiments of the present disclosure provide an operating system hot-switching method, which can ensure, to some extent, mutually exclusive access to and coordinated use of a hardware resource by multiple operating systems, thereby ensuring use reliability of the hardware resource after switching of an operating system. The embodiments of the present disclosure further provide a corresponding apparatus, and a mobile terminal. Details are separately described in the following.

To make a person skilled in the art understand the technical solutions in the present disclosure better, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
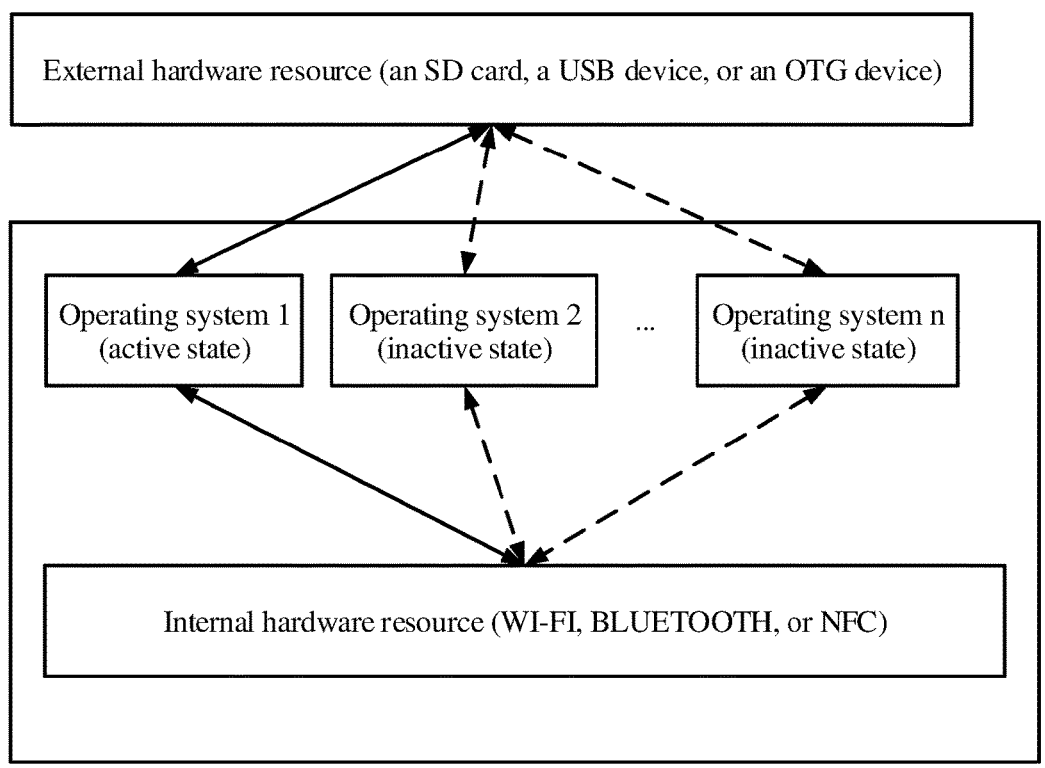
FIG. 1 is a schematic architecture diagram of operating systems and hardware resources of a terminal according to an embodiment of the present disclosure.

Referring to FIG. 1, FIG. 1 is a schematic principle diagram of architecture of operating systems and hardware resources of a mobile terminal according to an embodiment of the present disclosure.

The mobile terminal may simultaneously run multiple operating systems, such as an operating system 1, an operating system 2, . . . , an operating system n, where n is an integer greater than 2. The multiple operating systems included in the mobile terminal are multiplexed in a time division manner. In a time period, only one operating system can run in a foreground, and all other operating systems run in a background. As shown in FIG. 1, the operating system 1 is a foreground operating system, and all of the operating system 2 to the operating system n are background operating systems.

In this embodiment of the present disclosure, the foreground operating system is an operating system that runs in the foreground and that can interact with a user. The background operating system is an operating system that runs in the background and that cannot interact with the user.

The hardware resources of the mobile terminal include an internal hardware resource of the mobile terminal and a hot-swap hardware resource to which the mobile terminal is connected using a hot-swap interface. In this embodiment of the present disclosure, the hardware resources are hardware resources in the mobile terminal that are used for external interaction. The internal hardware resource may include a hardware resource that can perform external interaction, such as a WI-FI module, a BLUETOOTH module, a near field communication (NFC) module, an audio module, a video module, a display screen, and a camera that are of the mobile terminal. The hot-swap hardware resource may include a USB device connected using a USB interface, an SD card, and an On-The-Go (OTG) device connected using an OTG interface.

Figure 2:
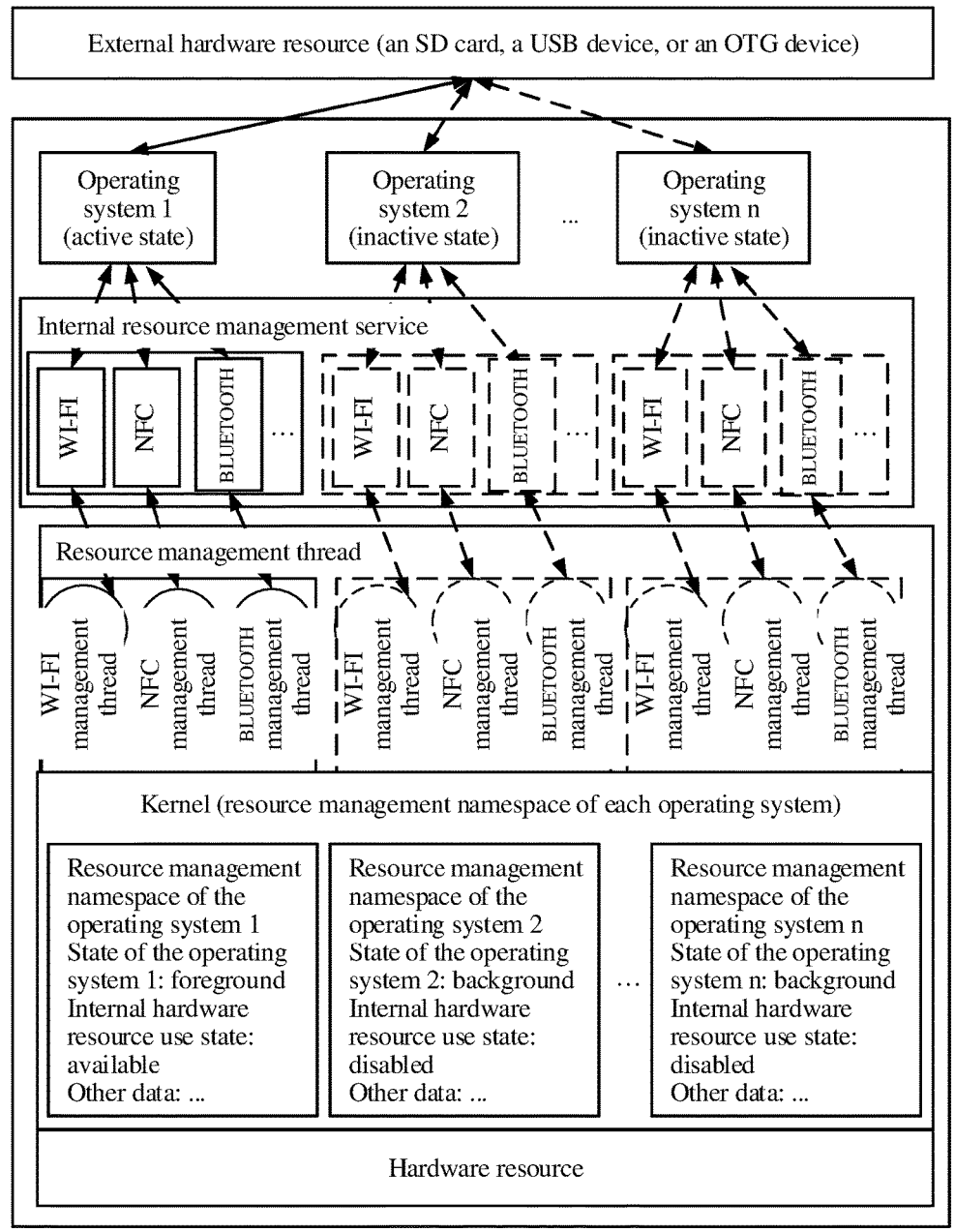
FIG. 2 is another schematic architecture diagram of operating systems and hardware resources of a terminal according to an embodiment of the present disclosure.

Referring to FIG. 2, FIG. 2 is another schematic principle diagram of architecture of operating systems and hardware resources of a mobile terminal according to an embodiment of the present disclosure.

For a hardware resource corresponding to each operating system, an internal resource management service for the operating system is maintained at a software layer. For example, for an operating system 1 to an operating system n, there are corresponding resource management service programs, such as WI-FI, NFC, and BLUETOOTH. When the operating system 1 is a current foreground operating system, an internal resource management service corresponding to the operating system 1 is started. When all of the operating system 2 to the operating system n run only in a background, internal resource management services corresponding to the operating system 2 to the operating system n are blocked. In addition, for each internal resource management service, there is a resource management thread group corresponding to the internal resource management service. For example, when the operating system 1 is the current foreground operating system, both the internal resource management service and a resource management thread that are corresponding to the operating system 1 are in a started state. When all other operating systems run only in the background, both internal resource management services and resource management threads that are corresponding to all the other operating systems are in a blocking state.

A resource management namespace corresponding to each operating system is maintained in a kernel. Each resource management namespace includes running status information of an operating system corresponding to the resource management namespace. The running status information is used to indicate whether the operating system is a foreground operating system or a background operating system, and is used to indicate that use of hardware in the mobile terminal by a foreground operating system is enabled or that use of hardware in the mobile terminal by a background operating system is shielded. For example, in a resource management namespace of the operating system 1 in FIG. 2, if a state of the operating system 1 is a foreground state, it indicates that the operating system 1 is a foreground operating system, if an internal hardware resource use state is an available state, it indicates that the operating system 1 can use an internal hardware resource. In a resource management namespace of the operating system 2 in FIG. 2, if a state of the operating system 2 is a background state, it indicates that the operating system 2 is a background operating system, if an internal hardware resource use state is an unavailable state, it indicates that the operating system 2 cannot use an internal hardware resource.

In this way, after each resource management thread reads that the state of the operating system 1 is the foreground state in the resource management namespace 1, the resource management thread corresponding to the operating system 1 is started, while the resource management threads corresponding to all the other operating systems are blocked. The internal resource management service corresponding to the operating system 1 is also started, while the internal resource management services corresponding to all the other operating systems are blocked.

When the operating system 1 is the foreground operating system, the resource management thread allows the operating system 1 to invoke the internal hardware resource. When the other operating systems run in the background, the resource management threads block invoking, by the other operating systems, of the internal hardware resource. Therefore, mutually exclusive use of a hardware resource by multiple operating systems is implemented.

Figure 3:
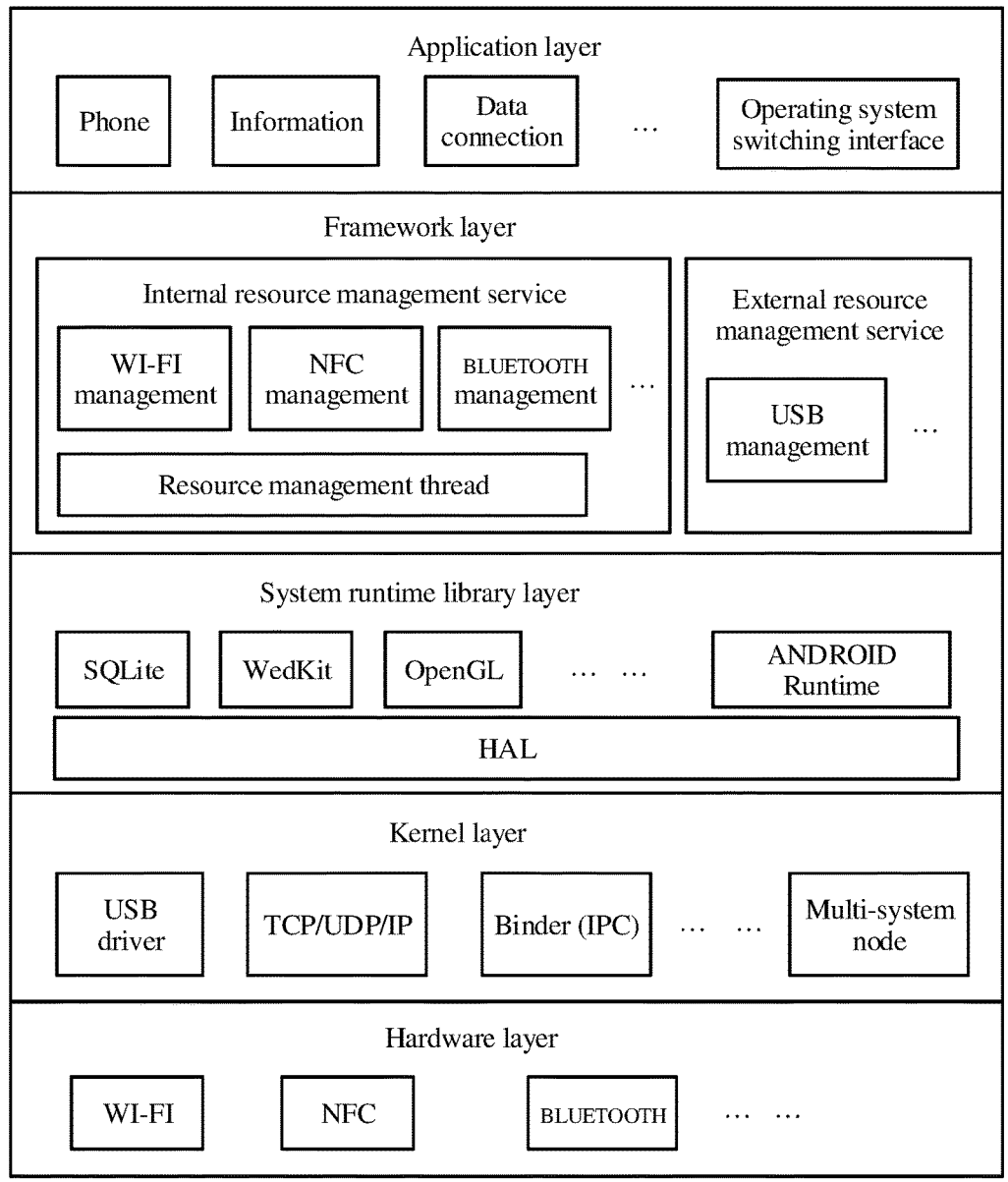
FIG. 3 is another schematic architecture diagram of operating systems and hardware resources of a terminal according to an embodiment of the present disclosure.

During operating system hot-switching, for an operating system hot-switching process in this embodiment of the present disclosure, reference may be made to FIG. 3 for understanding.

In this embodiment of the present disclosure, an implementation solution applied to a LINUX kernel-based ANDROID mobile phone is used as an example for description. An operating system of the ANDROID mobile phone is a LINUX kernel-based layered operating system of a smart mobile phone. The operating system of the ANDROID mobile phone is divided into five layers, which are respectively an application layer (JAVA Application), a framework layer (Frameworks), a system runtime library layer (User Libraries), a kernel layer (LINUX Kernel), and a hardware layer from top to bottom.

In this embodiment of the present disclosure, an operating system switching interface (System Switch) is disposed at the application layer and is used as ingress of operating system switching. The operating system switching interface exists in a form of an ANDROID package (APK) on a desktop of the mobile terminal. After the APK is tapped, a user interface of operating system switching may be provided for a user.

At the framework layer, an internal resource management thread (resource management thread) is set for an internal resource service. When the operating system is started, starting of each internal resource manager follows. On the one hand, a current foreground operating system is obtained using an identifier that is of the foreground operating system and that is recorded in a resource management namespace by the kernel such that the current foreground operating system can normally use an internal hardware resource, and a background operating system cannot use the internal hardware resource. On the other hand, a switching event sent by an operating system switching APK is monitored. The current foreground operating system first releases an internal hardware resource occupied by the operating system and notifies the kernel when receiving the switching event, and the kernel performs operating system switching after ensuring that releasing of all internal hardware resources is completed.

At the framework layer, an external resource management service is set for a hot-swap hardware resource, and the external resource management service is modified. When a hot-swap device is inserted into the mobile terminal, a hot-swap device insertion Uevent message sent by the kernel is intercepted. When the hot-swap device insertion Uevent message is received, a current foreground operating system is read, the current foreground operating system is bound to the inserted hot-swap device, and a background operating system is shielded. A hot-swap device removing Uevent message sent by the kernel is intercepted, and an operating system that is not bound to the hot-swap device is shielded.

At the kernel layer, a node that multiple operating systems need to use is established, and a corresponding node interface is provided to the outside, such as an interface used to obtain a current foreground operating system or an interface used to determine whether an operating system is being switched currently.

Figure 4:
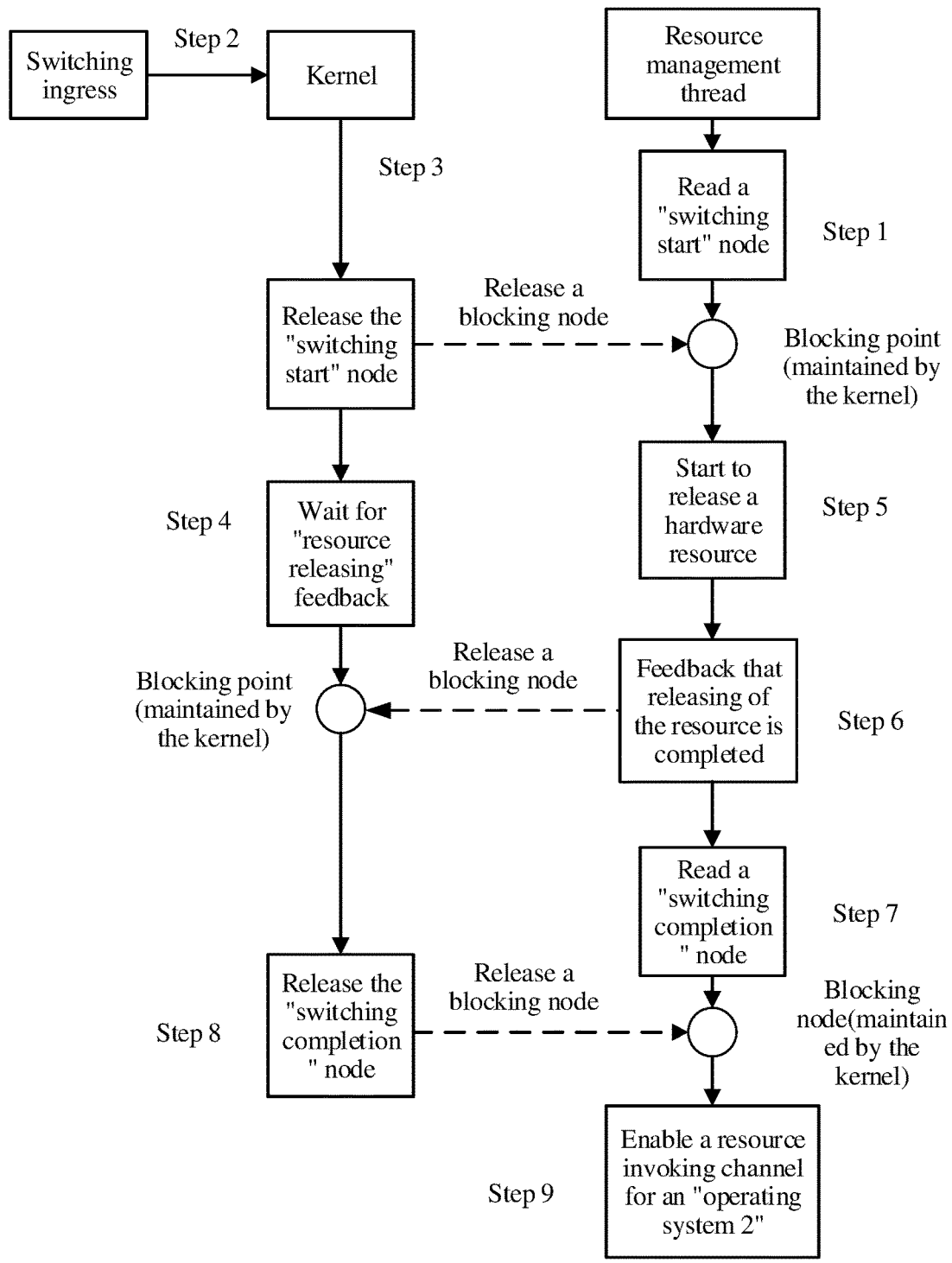
FIG. 4 is a schematic embodiment diagram of an operating system hot-switching method according to an embodiment of the present disclosure.

In the present disclosure, during switching of multiple operating systems running on a Linux kernel-based ANDROID mobile phone, for a process of managing an internal hardware resource, reference may be made to FIG. 4 for understanding.

Step 1: After the mobile terminal is powered on, a foreground operating system is automatically started, for example, an operating system 1, and after the operating system 1 is started, each resource management thread corresponding to the operating system 1 reads operating system status information and internal hardware resource use information that are in a resource management namespace of the operating system 1, and enables the operating system 1 to invoke an internal hardware resource. The resource management thread invokes a switching starting node of the kernel, where in this case, no switching event is input, and the switching starting node is a blocking node.

Step 2: A user chooses to switch an operating system 2 to a foreground using System Switch on a desktop, where this action invokes a switching interface provided by the kernel to notify the kernel that an operating system switching event occurs.

Step 3: The kernel receives the switching event delivered by an upper-layer APK, and releases the switching starting node invoked by all the resource management threads.

Step 4: After notifying all the resource management threads that operating system switching starts, the kernel enters a wait state to wait for all the resource management threads to feed back a resource releasing status.

Step 5: After the resource management thread is unblocked, the resource management thread starts to work, and starts to release a currently occupied internal hardware resource.

Step 6: After releasing of the internal hardware resource is completed, invoke an interface provided by the kernel, such as an NFC resource releasing completion interface in order to notify the kernel that releasing of the internal hardware resource monitored by the current thread is completed.

Step 7: After feeding back to the kernel that releasing of the internal hardware resource is completed, the internal hardware resource management thread re-enters a blocking state to wait for the kernel to notify that system switching is completed.

Step 8: After detecting that all the resource management threads feedback that releasing of internal hardware resources monitored by the resource management threads is completed, the kernel unblocks the current wait state, and notifies all the resource management threads that operating system switching is completed.

Step 9: After the resource management thread is unblocked, the resource management thread starts to work, enables the operating system 2 that is switched to the foreground to invoke the internal hardware resource, and re-enters the blocking state to wait for a next switching to come.

In a process of switching the operating system 1 to the operating system 2, a state that is of the operating system 1 and is in the resource management namespace of the operating system 1 is modified to background, and an internal hardware resource use state of the operating system 1 is modified to disabled. A state that is of the operating system 2 and is in a resource management namespace of the operating system 2 is modified to foreground, and an internal hardware resource use state of the operating system 2 is modified to available.

Figure 5:
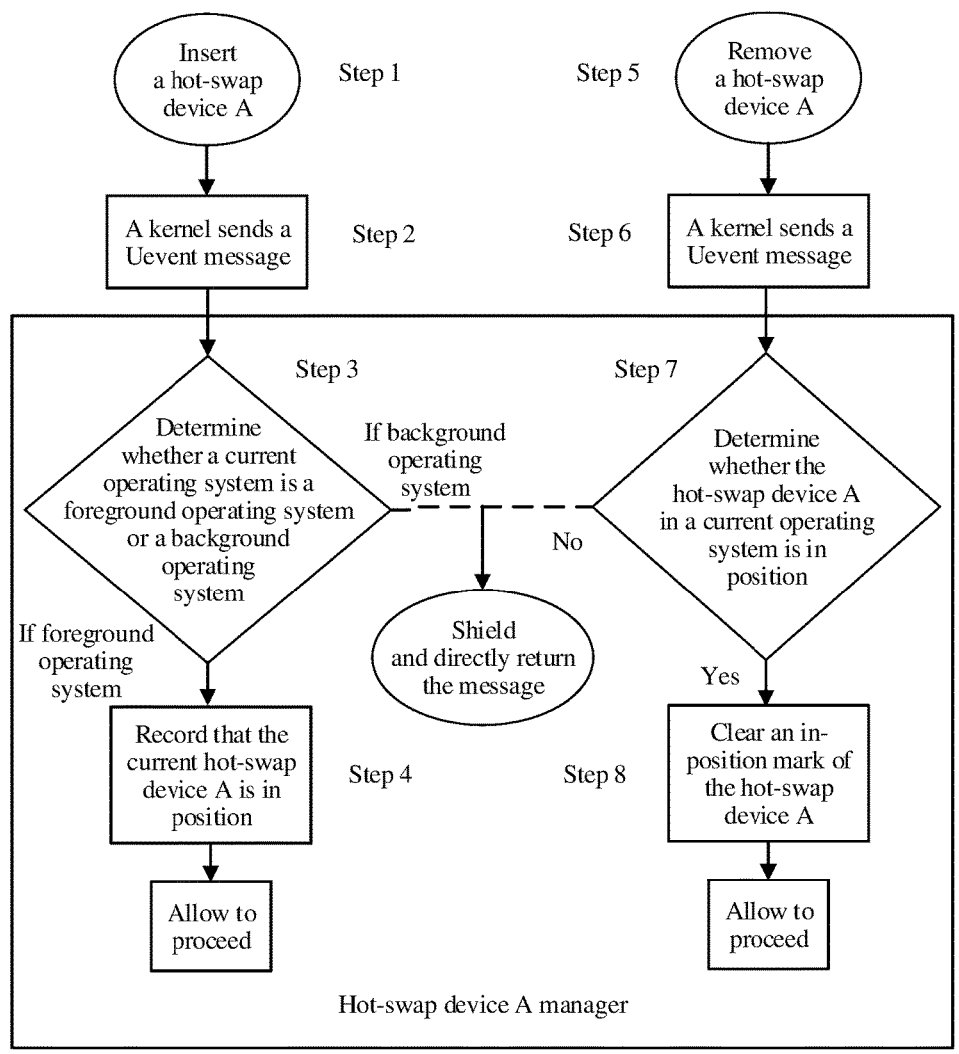
FIG. 5 is another schematic embodiment diagram of an operating system hot-switching method according to an embodiment of the present disclosure.

In the present disclosure, a process in which multiple operating systems running on a LINUX kernel-based ANDROID mobile phone manage an internal hardware resource is used as an example for description, and reference may be made to FIG. 5 for understanding.

A procedure for inserting a hot-swap device is as follows.

Step 1: A user inserts a hot-swap device A into the mobile phone.

Step 2: When detecting that the hot-swap device A is inserted, the kernel sends a Uevent message to a hot-swap device A manager (an external resource management service at the framework layer in FIG. 3) of each operating system.

Step 3: After receiving the hot-swap device A insertion Uevent message sent by the kernel, the hot-swap device A manager determines whether an operating system in which the hot-swap device A manager is currently located is a foreground operating system or a background operating system, where if the operating system is the background operating system, the Uevent message is shielded and directly returned, or if the operating system is the foreground operating system, go to step 4.

Step 4: After receiving the hot-swap device A insertion Uevent message, the foreground operating system adds an in-position state of the current hot-swap device A, and then allows a manager of the hot-swap device A to continue to process this Uevent message, where subsequently, the hot-swap device A is bound to an operating system that is currently in an active state and can be normally used by the current system, and even though system switching occurs, the binding to the bound system is not unbound.

A procedure for removing a hot-swap device is as follows.

Step 5: A user removes a hot-swap device A from the mobile phone.

Step 6: When detecting that the hot-swap device A is removed, the kernel sends a Uevent message to a hot-swap device A manager of each operating system.

Step 7: After receiving the hot-swap device A removing Uevent message sent by the kernel, the hot-swap device A manager determines whether the hot-swap device A in an operating system in which the manager is currently located is in position, where if the hot-swap device A is not in position, the Uevent message is shielded and directly returned, or if the hot-swap device A is in position, go to step 8.

Step 8: After receiving the hot-swap device A removing message, the operating system in which the hot-swap device A is in position clears an in-position mark of the hot-swap device A, and then allows the hot-swap device A manager to continue to process this Uevent message, where binding between the hot-swap device A manager and an originally bound system is unbound, and after the hot-swap device A is re-inserted, the hot-swap device A can be bound to a current foreground operating system and be normally used by the current foreground operating system.

In this embodiment of the present disclosure, the in-position mark may be maintained in resource management space of each operating system.

In the other approaches, a case in which multiple operating systems simultaneously use a same hardware resource frequently occurs, which causes abnormal use of the hardware resource. In comparison, according to the operating system hot-switching method provided in this embodiment of the present disclosure, when operating system hot-switching is performed, a hardware resource occupied by a current foreground operating system may be first released, and the hardware resource is instructed, using running status information in a resource management namespace in order to shield access to the hardware resource by a background operating system, which ensures, to some extent, mutually exclusive access to and coordinated use of the hardware resource by multiple operating systems, thereby ensuring use reliability of the hardware resource after switching of an operating system.

According to the operating system hot-switching method provided in this embodiment of the present disclosure, when hot switching is performed on multiple sets of systems running on a mobile terminal, it can be ensured that an internal hardware resource occupied by a foreground operating system before switching is released completely. After the foreground operating system is switched, it can be ensured that the internal hardware resource is normally used by an operating system after switching in order to prevent probable occurrence of function abnormality of an individual resource caused by preemptive use.

Figure 6:
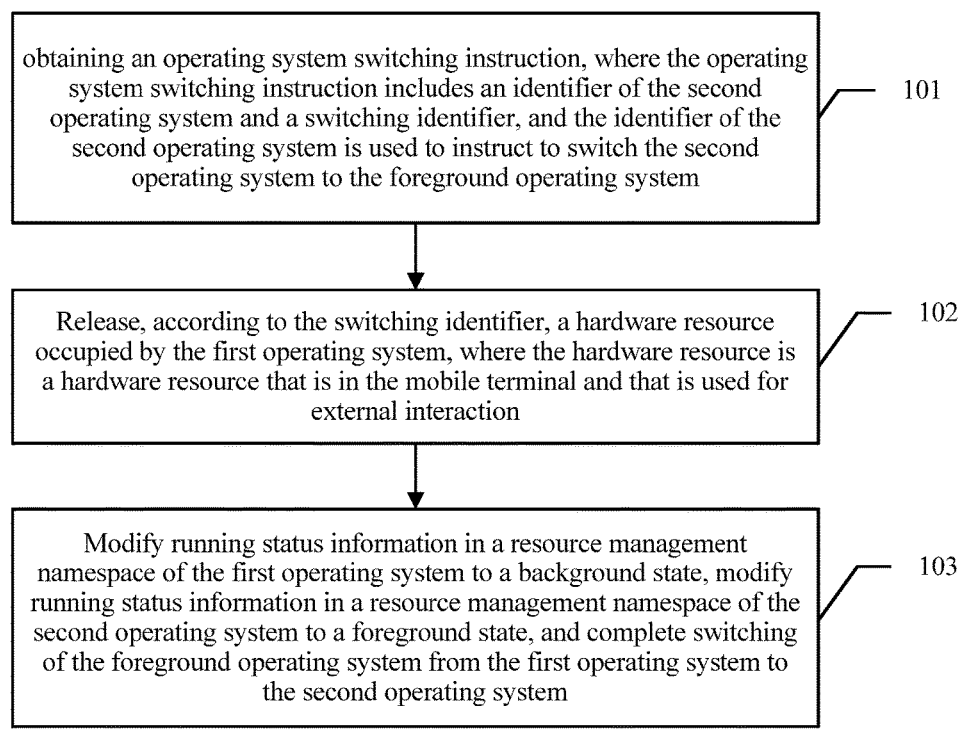
FIG. 6 is another schematic embodiment diagram of an operating system hot-switching method according to an embodiment of the present disclosure.

Referring to FIG. 6, an embodiment of the present disclosure provides an operating system hot-switching method. The method is applied to a mobile terminal running multiple operating systems, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system. The method includes the following steps.

Step 101: Obtain an operating system switching instruction, where the operating system switching instruction includes an identifier of the second operating system and a switching identifier, and the identifier of the second operating system is used to instruct to switch the second operating system to the foreground operating system.

Step 102: Release, according to the switching identifier, a hardware resource occupied by the first operating system, where the hardware resource is a hardware resource that is in the mobile terminal and that is used for external interaction.

Step 103: Modify running status information in a resource management namespace of the first operating system to a background state, modify running status information in a resource management namespace of the second operating system to a foreground state, and complete switching of the foreground operating system from the first operating system to the second operating system.

The operating system hot-switching method provided in this embodiment of the present disclosure is applied to a mobile terminal running multiple operating systems. The multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system. The method includes obtaining an operating system switching instruction, where the operating system switching instruction includes an identifier of the second operating system and a switching identifier, and the identifier of the second operating system is used to instruct to switch the second operating system to the foreground operating system, releasing, according to the switching identifier, a hardware resource occupied by the first operating system, where the hardware resource is a hardware resource that is in the mobile terminal and that is used for external interaction, and modifying running status information in a resource management namespace of the first operating system to a background state, modifying running status information in a resource management namespace of the second operating system to a foreground state, and completing switching of the foreground operating system from the first operating system to the second operating system. In the other approaches, a case in which multiple operating systems simultaneously use a same hardware resource frequently occurs, which causes abnormal use of the hardware resource. In comparison, according to the operating system hot-switching method provided in this embodiment of the present disclosure, when operating system hot-switching is performed, a hardware resource occupied by a current foreground operating system may be first released, and the hardware resource is instructed, using running status information in a resource management namespace, to shield access to the hardware resource by a background operating system, which ensures, to some extent, mutually exclusive access to and coordinated use of the hardware resource by multiple operating systems, thereby ensuring use reliability of the hardware resource after switching of an operating system.

Optionally, on the basis of the foregoing embodiment corresponding to FIG. 6, in a first optional embodiment of the operating system hot-switching method provided in this embodiment of the present disclosure, after releasing, according to the switching identifier, the hardware resource occupied by the first operating system, where the hardware resource is a hardware resource that is in the mobile terminal and that is used for external interaction, the method may further include determining, from a global resource linked list, the resource management namespace of the second operating system according to the identifier of the second operating system, where the global resource linked list includes a correspondence between an identifier of an operating system and a resource management namespace of the operating system.

In this embodiment of the present disclosure, each resource management namespace corresponding to each operating system is maintained using the global resource linked list, which can speed up operating system hot-switching.

Optionally, on the basis of the foregoing embodiment corresponding to FIG. 6 or the first optional embodiment, in a second optional embodiment of the operating system hot-switching method provided in this embodiment of the present disclosure, releasing, according to the switching identifier, a hardware resource occupied by the first operating system includes unblocking, according to the switching identifier, a blocking state of a switching start identifier in the blocking state to obtain an unblocked switching start identifier, where the unblocked switching start identifier is used to instruct a resource management thread to notify the hardware that is in the mobile terminal and is used for external interaction to release the hardware resource occupied by the first operating system, and the switching start identifier in the blocking state is used to instruct to forbid execution of operating system switching.

In this embodiment of the present disclosure, the unblocked switching start identifier instructs to release the hardware resource, which improves hardware resource releasing efficiency.

Optionally, on the basis of the foregoing second optional embodiment of the operating system hot-switching method, in a third optional embodiment of the operating system hot-switching method provided in this embodiment of the present disclosure, after completing switching of the foreground operating system from the first operating system to the second operating system, the method may further include allocating the hardware resource to the second operating system for use, and restoring the unblocked switching start identifier to the blocking state after allocating the hardware resource to the second operating system for use.

In this embodiment of the present disclosure, after operating system switching is completed, the unblocked switching start identifier is restored to the blocking state in time. Therefore, mutually exclusive use of the hardware resource by the multiple operating systems is further improved.

Optionally, on the basis of the foregoing embodiment corresponding to FIG. 6 and the first, the second, or the third optional embodiment, in a fourth optional embodiment of the operating system hot-switching method provided in this embodiment of the present disclosure, after completing switching of the foreground operating system from the first operating system to the second operating system, the method may further include monitoring a hot-swap interface of the mobile terminal, and clearing an in-position mark of the first hot-swap device from the resource management namespace of the first operating system in order to unbind a binding relationship between the first hot-swap device and the first operating system when a first hot-swap device is removed from the mobile terminal, where the in-position mark of the first hot-swap device is used to indicate that the first hot-swap device is used by the first operating system.

In this embodiment of the present disclosure, after a current operating system is switched, a binding relationship between a hot-swap device and an operating system before switching may be unbound in time, which ensures mutually exclusive use of the hot-swap device by the multiple operating systems.

Optionally, on the basis of the foregoing embodiment corresponding to FIG. 6 and the first, the second, the third, or the fourth optional embodiment, in a fifth optional embodiment of the operating system hot-switching method provided in this embodiment of the present disclosure, the method may further include monitoring the hot-swap interface of the mobile terminal, and adding an in-position mark of the second hot-swap device to the resource management namespace of the second operating system in order to establish a binding relationship between the second hot-swap device and the second operating system when a second hot-swap device is inserted into the mobile terminal, where the in-position mark of the second hot-swap device is used to indicate that the second hot-swap device is used by the second operating system.

In this embodiment of the present disclosure, after a current operating system is switched, a binding relationship between a hot-swap device and an operating system after switching may be established. Therefore, mutually exclusive use of the hot-swap device by the multiple operating systems is ensured.

For the operating system hot-switching method provided in the embodiment corresponding to FIG. 6 in the present disclosure or the optional embodiments in the present disclosure, reference may be made to descriptions in FIG. 1 to FIG. 5 for understanding, and details are not described herein again.

Figure 7:
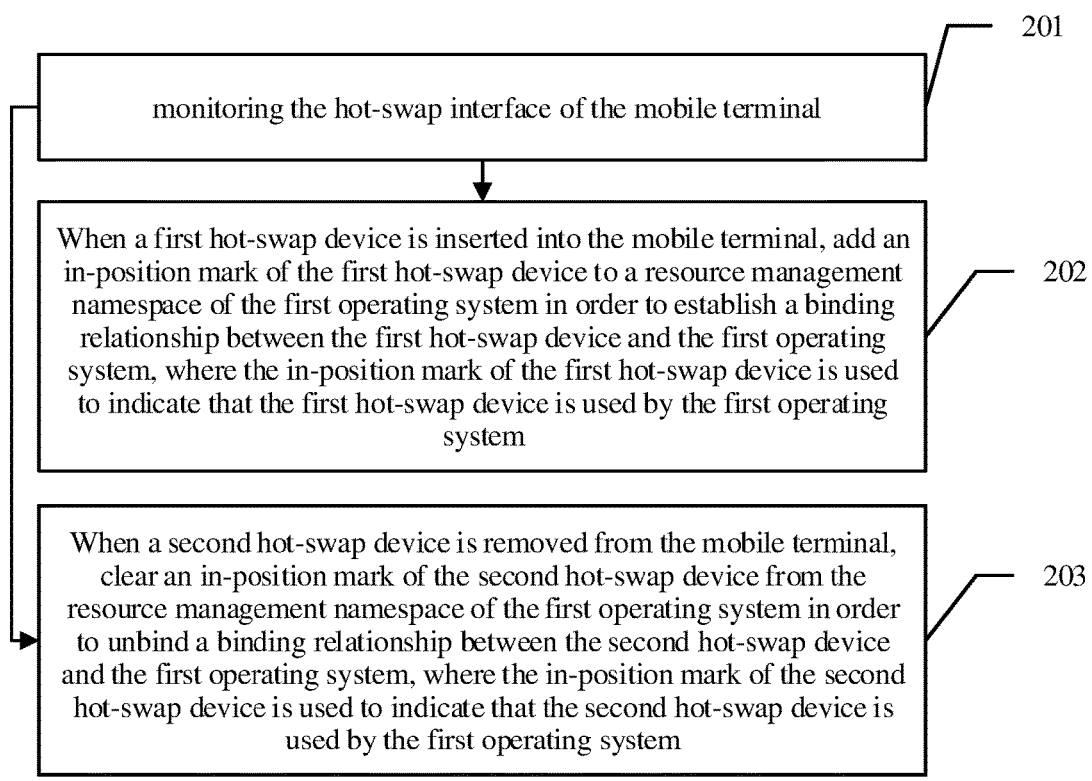
FIG. 7 is a schematic embodiment diagram of a hot-swap device management method according to an embodiment of the present disclosure.

Referring to FIG. 7, a hot-swap device management method provided in an embodiment of the present disclosure provides. The method is applied to a mobile terminal running multiple operating systems, the mobile terminal provides a hot-swap interface, hot swapping is implemented between a hot-swap device and the mobile terminal using the hot-swap interface, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system. The method includes the following steps.

Step 201: Monitor the hot-swap interface of the mobile terminal.

Step 202: When a first hot-swap device is inserted into the mobile terminal, add an in-position mark of the first hot-swap device to a resource management namespace of the first operating system in order to establish a binding relationship between the first hot-swap device and the first operating system, where the in-position mark of the first hot-swap device is used to indicate that the first hot-swap device is used by the first operating system.

Step 203: When a second hot-swap device is removed from the mobile terminal, clear an in-position mark of the second hot-swap device from the resource management namespace of the first operating system in order to unbind a binding relationship between the second hot-swap device and the first operating system, where the in-position mark of the second hot-swap device is used to indicate that the second hot-swap device is used by the first operating system.

The hot-swap device management method provided in this embodiment of the present disclosure is applied to a mobile terminal running multiple operating systems. The mobile terminal provides a hot-swap interface, hot swapping is implemented between a hot-swap device and the mobile terminal using the hot-swap interface, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system. The method includes monitoring the hot-swap interface of the mobile terminal, adding an in-position mark of the first hot-swap device to a resource management namespace of the first operating system in order to establish a binding relationship between the first hot-swap device and the first operating system when a first hot-swap device is inserted into the mobile terminal, where the in-position mark of the first hot-swap device is used to indicate that the first hot-swap device is used by the first operating system, and clearing an in-position mark of the second hot-swap device from the resource management namespace of the first operating system in order to unbind a binding relationship between the second hot-swap device and the first operating system when a second hot-swap device is removed from the mobile terminal, where the in-position mark of the second hot-swap device is used to indicate that the second hot-swap device is used by the first operating system. In the other approaches, a conflict occurs in use of a hot-swap device by multiple operating systems. In comparison, according to the hot-swap device management method provided in this embodiment of the present disclosure, a hot-swap device may be bound to or unbound from a current operating system in order to avoid a conflict in use of the hot-swap device by multiple operating systems, thereby ensuring mutually exclusive use of the hot-swap device by the multiple operating systems.

Optionally, on the basis of the foregoing embodiment corresponding to FIG. 7, in another embodiment of the hot-swap device management method provided in this embodiment of the present disclosure, after the foreground operating system is switched from the first operating system to the second operating system, the method may further include clearing the in-position mark of the first hot-swap device from the resource management namespace of the first operating system in order to unbind the binding relationship between the first hot-swap device and the first operating system when the first hot-swap device is removed from the mobile terminal, where the in-position mark of the first hot-swap device is used to indicate that the first hot-swap device is used by the first operating system, and adding the in-position mark of the second hot-swap device to a resource management namespace of the second operating system in order to establish a binding relationship between the second hot-swap device and the second operating system when the second hot-swap device is inserted into the mobile terminal, where the in-position mark of the second hot-swap device is used to indicate that the second hot-swap device is used by the second operating system.

In this embodiment of the present disclosure, after a current operating system is switched, a binding relationship between a hot-swap device and an operating system after switching may be established. Therefore, mutually exclusive use of the hot-swap device by the multiple operating systems is ensured.

Figure 8:
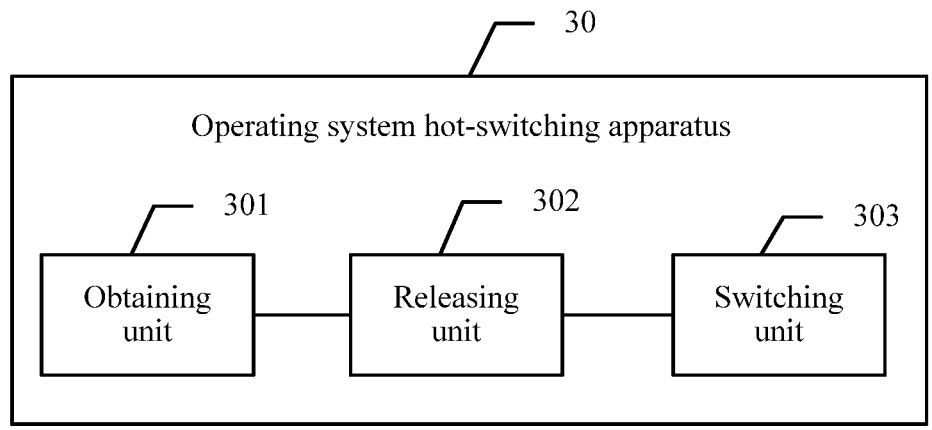
FIG. 8 is a schematic embodiment diagram of an operating system hot-switching apparatus according to an embodiment of the present disclosure.

Referring to FIG. 8, an embodiment of the present disclosure provides an operating system hot-switching apparatus 30. The apparatus 30 is applied to a mobile terminal running multiple operating systems, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system. The apparatus 30 includes an obtaining unit 301 configured to obtain an operating system switching instruction, where the operating system switching instruction includes an identifier of the second operating system and a switching identifier, and the identifier of the second operating system is used to instruct to switch the second operating system to the foreground operating system, a releasing unit 302 configured to release, according to the switching identifier obtained by the obtaining unit 301, a hardware resource occupied by the first operating system, where the hardware resource is a hardware resource that is in the mobile terminal and that is used for external interaction, and after the releasing unit 302 releases the hardware resource, a switching unit 303 configured to modify running status information in a resource management namespace of the first operating system to a background state, modify running status information in a resource management namespace of the second operating system to a foreground state, and complete switching of the foreground operating system from the first operating system to the second operating system.

According to the operating system hot-switching apparatus 30 provided in this embodiment of the present disclosure, the apparatus 30 is applied to a mobile terminal running multiple operating systems, where the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system. The apparatus 30 includes an obtaining unit 301 configured to obtain an operating system switching instruction, where the operating system switching instruction includes an identifier of the second operating system and a switching identifier, and the identifier of the second operating system is used to instruct to switch the second operating system to the foreground operating system, a releasing unit 302 configured to release, according to the switching identifier obtained by the obtaining unit 301, a hardware resource occupied by the first operating system, where the hardware resource is a hardware resource that is in the mobile terminal and that is used for external interaction, and after the releasing unit 302 releases the hardware resource, a switching unit 303 configured to modify running status information in a resource management namespace of the first operating system to a background state, modify running status information in a resource management namespace of the second operating system to a foreground state, and complete switching of the foreground operating system from the first operating system to the second operating system. In the other approaches, a case in which multiple operating systems simultaneously use a same hardware resource frequently occurs, which causes abnormal use of the hardware resource. In comparison, when operating system hot-switching is performed, the operating system hot-switching apparatus 30 provided in this embodiment of the present disclosure may first release a hardware resource occupied by a current foreground operating system, and then instruct, using running status information in a resource management namespace, the hardware resource to shield access to the hardware resource by a background operating system, which ensures, to some extent, mutually exclusive access to and coordinated use of the hardware resource by multiple operating systems, thereby ensuring use reliability of the hardware resource after switching of an operating system.

Figure 9:
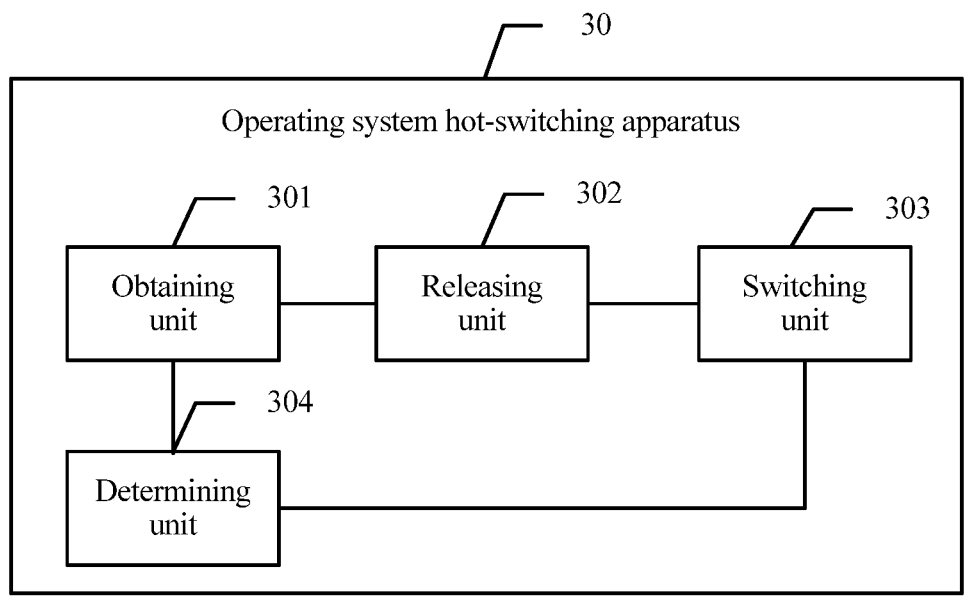
FIG. 9 is another schematic embodiment diagram of an operating system hot-switching apparatus according to an embodiment of the present disclosure.

Optionally, on the basis of the foregoing embodiment corresponding to FIG. 8, referring to FIG. 9, in a first optional embodiment of the operating system hot-switching apparatus 30 provided in this embodiment of the present disclosure, the apparatus 30 further includes a determining unit 304 configured to determine, from a global resource linked list, the resource management namespace of the second operating system according to the identifier that is of the second operating system and is obtained by the obtaining unit 301, where the global resource linked list includes a correspondence between an identifier of an operating system and a resource management namespace of the operating system.

In this embodiment of the present disclosure, each resource management namespace corresponding to each operating system is maintained using the global resource linked list, which can speed up operating system hot-switching.

Optionally, on the basis of the foregoing embodiment corresponding to FIG. 8 or the first optional embodiment corresponding to FIG. 9, in a second optional embodiment of the operating system hot-switching apparatus 30 provided in the this embodiment of the present disclosure, the releasing unit 302 is further configured to unblock, according to the switching identifier, a blocking state of a switching start identifier in the blocking state to obtain an unblocked switching start identifier, where the unblocked switching start identifier is used to instruct a resource management thread to notify the hardware in the mobile terminal to release the hardware resource occupied by the first operating system, and the switching start identifier in the blocking state is used to instruct to forbid execution of operating system switching.

In this embodiment of the present disclosure, the unblocked switching start identifier instructs to release the hardware resource, which improves hardware resource releasing efficiency.

Figure 10:
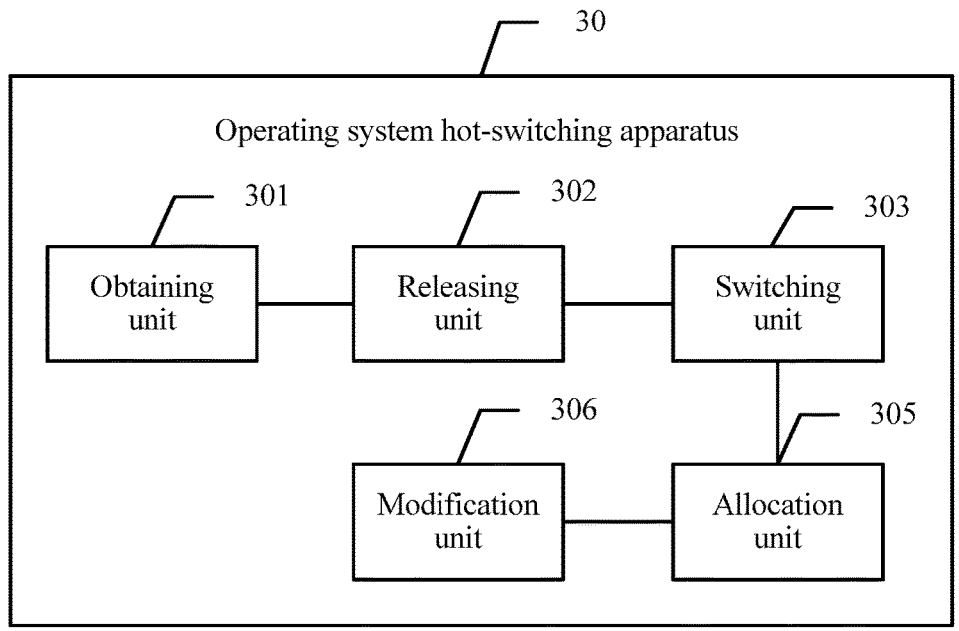
FIG. 10 is another schematic embodiment diagram of an operating system hot-switching apparatus according to an embodiment of the present disclosure.

Optionally, on the basis of the foregoing second optional embodiment of the hot-switching apparatus 30, referring to FIG. 10, in a third optional embodiment of the operating system hot-switching apparatus 30 provided in this embodiment of the present disclosure, the apparatus 30 further includes an allocation unit 305 configured to allocate the hardware resource to the second operating system for use after the switching unit 303 completes switching of the foreground operating system from the first operating system to the second operating system, and a modification unit 306 configured to restore the unblocked switching start identifier to the blocking state after the allocation unit 305 allocates the hardware resource to the second operating system for use.

In this embodiment of the present disclosure, after operating system switching is completed, the unblocked switching start identifier is restored to the blocking state in time. Therefore, mutually exclusive use of the hardware resource by the multiple operating systems is further improved.

Figure 11:
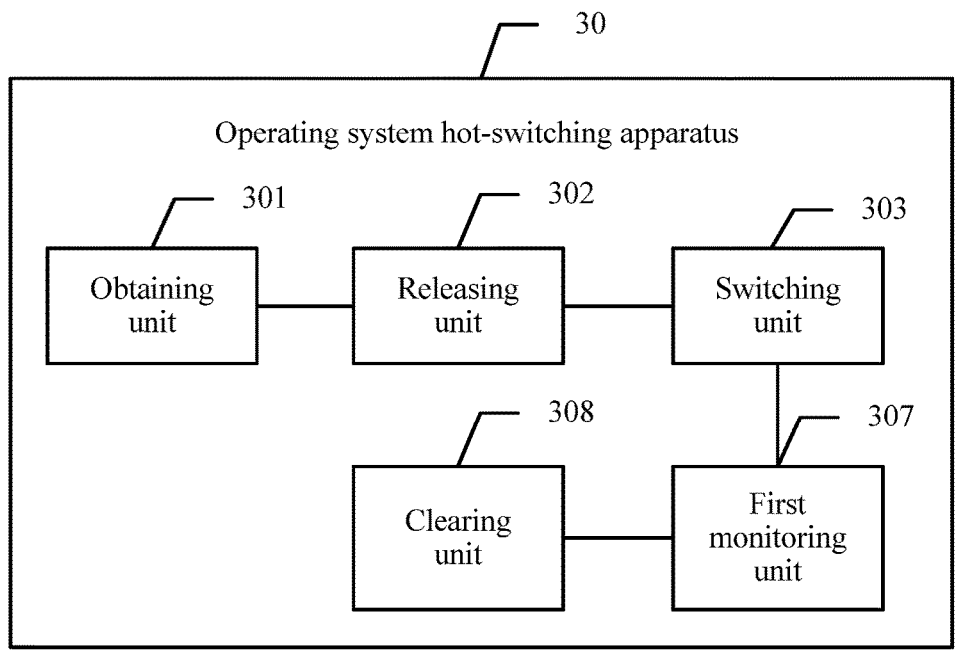
FIG. 11 is another schematic embodiment diagram of an operating system hot-switching apparatus according to an embodiment of the present disclosure.

Optionally, on the basis of the foregoing embodiment, corresponding to FIG. 8, of the hot-switching apparatus 30 and the first, the second, or the third optional embodiment of the apparatus 30, referring to FIG. 11, in a fourth optional embodiment of the operating system hot-switching apparatus 30 provided in this embodiment of the present disclosure, the apparatus 30 further includes a first monitoring unit 307 configured to monitor a hot-swap interface of the mobile terminal after the switching unit 303 completes switching of the foreground operating system from the first operating system to the second operating system, and a clearing unit 308 configured to clear an in-position mark of the first hot-swap device from the resource management namespace of the first operating system in order to unbind a binding relationship between the first hot-swap device and the first operating system when the first monitoring unit 307 monitors that a first hot-swap device is removed from the mobile terminal, where the in-position mark of the first hot-swap device is used to indicate that the first hot-swap device is used by the first operating system.

In this embodiment of the present disclosure, after a current operating system is switched, a binding relationship between a hot-swap device and an operating system before switching may be unbound in time, which ensures mutually exclusive use of the hot-swap device by the multiple operating systems.

Figure 12:
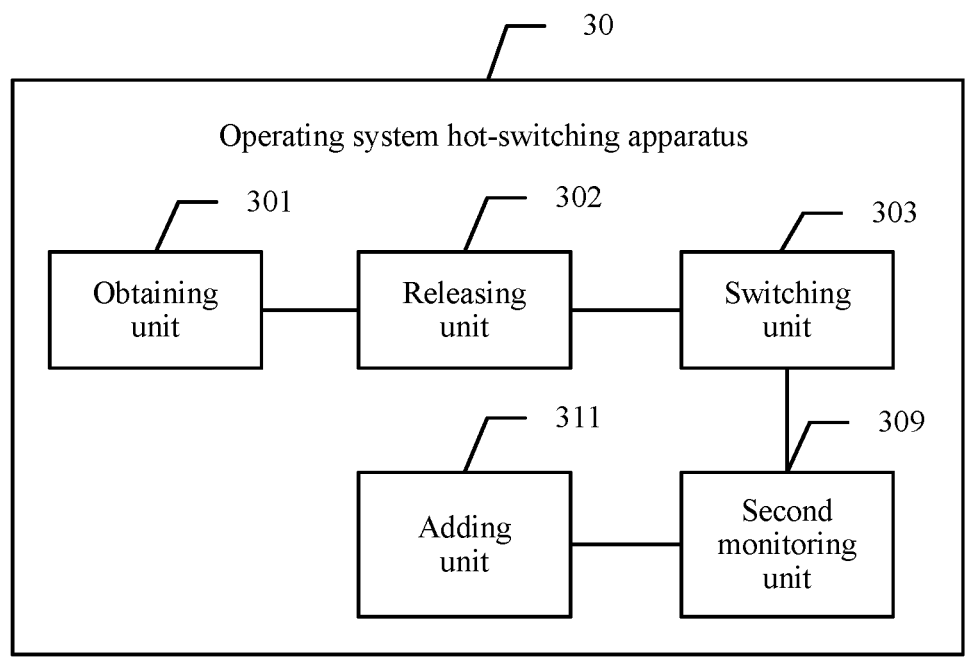
FIG. 12 is another schematic embodiment diagram of an operating system hot-switching apparatus according to an embodiment of the present disclosure.

Optionally, on the basis of the foregoing embodiment, corresponding to FIG. 8, of the hot-switching apparatus 30 or the first, the second, the third, or the fourth optional embodiment of the apparatus 30, referring to FIG. 12, in a fifth optional embodiment of the operating system hot-switching apparatus 30 provided in this embodiment of the present disclosure, the apparatus 30 further includes a second monitoring unit 309 configured to monitor the hot-swap interface of the mobile terminal, and an adding unit 311 configured to add an in-position mark of the second hot-swap device to the resource management namespace of the second operating system in order to establish a binding relationship between the second hot-swap device and the second operating system when the second monitoring unit 309 monitors that a second hot-swap device is inserted into the mobile terminal, where the in-position mark of the second hot-swap device is used to indicate that the second hot-swap device is used by the second operating system.

In this embodiment of the present disclosure, after a current operating system is switched, a binding relationship between a hot-swap device and an operating system after switching may be established. Therefore, mutually exclusive use of the hot-swap device by the multiple operating systems is ensured.

For the operating system hot-switching apparatus 30 provided in this embodiment of the present disclosure, reference may be made to descriptions in FIG. 1 to FIG. 6 for understanding, and details are not described herein again.

Figure 13:
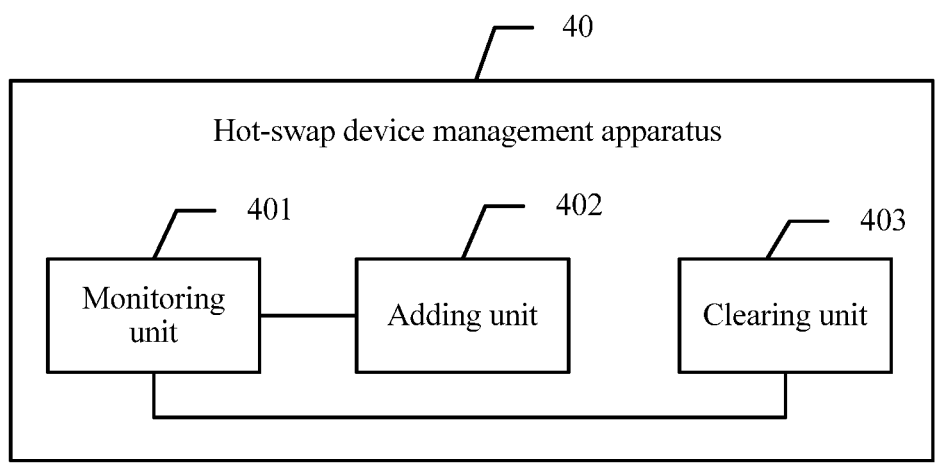
FIG. 13 is a schematic embodiment diagram of a hot-swap device management apparatus according to an embodiment of the present disclosure.

Referring to FIG. 13, an embodiment of the present disclosure provides a hot-swap device management apparatus 40. The apparatus 40 is applied to a mobile terminal running multiple operating systems, the mobile terminal provides a hot-swap interface, hot swapping is implemented between a hot-swap device and the mobile terminal using the hot-swap interface, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system. The apparatus 40 includes a monitoring unit 401 configured to monitor the hot-swap interface of the mobile terminal, an adding unit 402 configured to add an in-position mark of the first hot-swap device to a resource management namespace of the first operating system in order to establish a binding relationship between the first hot-swap device and the first operating system when the monitoring unit 401 monitors that a first hot-swap device is inserted into the mobile terminal, where the in-position mark of the first hot-swap device is used to indicate that the first hot-swap device is used by the first operating system, and a clearing unit 403 configured to clear an in-position mark of the second hot-swap device from the resource management namespace of the first operating system in order to unbind a binding relationship between the second hot-swap device and the first operating system, when the monitoring unit 401 monitors that a second hot-swap device is removed from the mobile terminal where the in-position mark of the second hot-swap device is used to indicate that the second hot-swap device is used by the first operating system.

The hot-swap device management apparatus 40 provided in this embodiment of the present disclosure is applied to a mobile terminal running multiple operating systems. The mobile terminal provides a hot-swap interface, hot swapping is implemented between a hot-swap device and the mobile terminal using the hot-swap interface, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system. The apparatus 40 includes a monitoring unit 401 configured to monitor the hot-swap interface of the mobile terminal, an adding unit 402 configured to add an in-position mark of the first hot-swap device to a resource management namespace of the first operating system in order to establish a binding relationship between the first hot-swap device and the first operating system when the monitoring unit 401 monitors that a first hot-swap device is inserted into the mobile terminal, where the in-position mark of the first hot-swap device is used to indicate that the first hot-swap device is used by the first operating system, and a clearing unit 403 configured to clear an in-position mark of the second hot-swap device from the resource management namespace of the first operating system in order to unbind a binding relationship between the second hot-swap device and the first operating system when the monitoring unit 401 monitors that a second hot-swap device is removed from the mobile terminal, where the in-position mark of the second hot-swap device is used to indicate that the second hot-swap device is used by the first operating system. In the other approaches, a conflict occurs in use of a hot-swap device by multiple operating systems. In comparison, according to the hot-swap device management apparatus provided in this embodiment of the present disclosure, a hot-swap device may be bound to or unbound from a current operating system in order to avoid a conflict in use of the hot-swap device by multiple operating systems, thereby ensuring mutually exclusive use of the hot-swap device by the multiple operating systems.

Optionally, on the basis of the foregoing embodiment corresponding to FIG. 13, in another embodiment of the hot-swap device management apparatus 40 provided in this embodiment of the present disclosure, the clearing unit 403 is further configured to clear the in-position mark of the first hot-swap device from the resource management namespace of the first operating system in order to unbind the binding relationship between the first hot-swap device and the first operating system after the foreground operating system is switched from the first operating system to the second operating system, when the monitoring unit 401 monitors that the first hot-swap device is removed from the mobile terminal, where the in-position mark of the first hot-swap device is used to indicate that the first hot-swap device is used by the first operating system, and the adding unit 402 is further configured to add the in-position mark of the second hot-swap device to a resource management namespace of the second operating system in order to establish a binding relationship between the second hot-swap device and the second operating system after the foreground operating system is switched from the first operating system to the second operating system, when the monitoring unit 401 monitors that the second hot-swap device is inserted into the mobile terminal, where the in-position mark of the second hot-swap device is used to indicate that the second hot-swap device is used by the second operating system.

In this embodiment of the present disclosure, a current operating system is switched, a binding relationship between a hot-swap device and an operating system after switching may be established. Therefore, mutually exclusive use of the hot-swap device by the multiple operating systems is ensured.

For the hot-swap device management apparatus 40 provided in this embodiment of the present disclosure, reference may be made to descriptions in FIG. 5, and FIG. 7 for understanding, and details are not described herein again.

Figure 14:
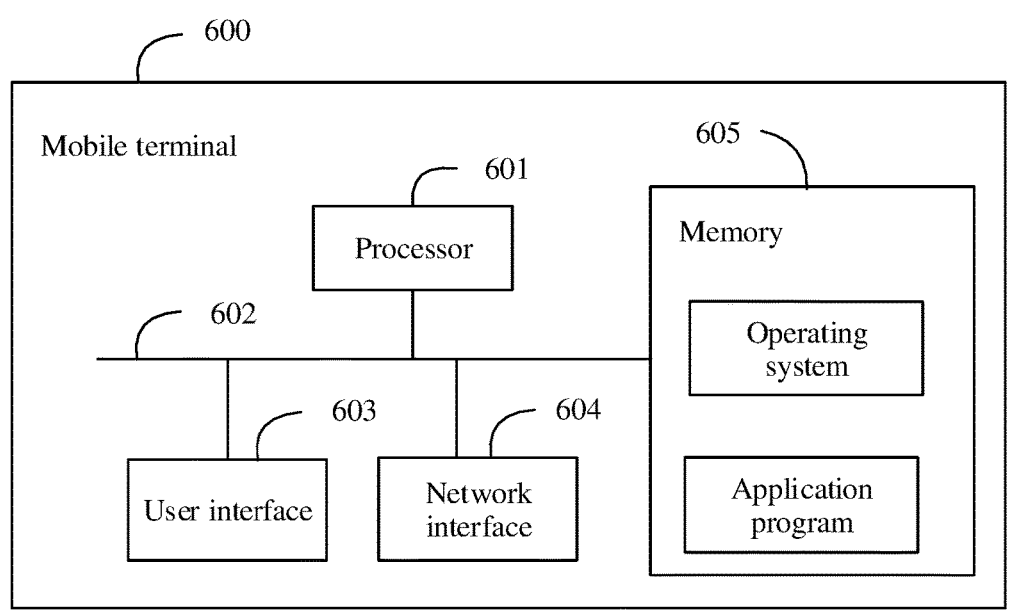
FIG. 14 is a schematic embodiment diagram of a mobile terminal according to an embodiment of the present disclosure.

FIG. 14 shows a structure of a mobile terminal 600 according to an embodiment of the present disclosure. The mobile terminal 600 includes at least one processor 601, at least one network interface 604 or a user interface 603, a memory 605, and at least one communications bus 602. The communications bus 602 is configured to implement connections and communication between these components. Optionally, the mobile terminal 600 includes a user interface 603 and includes a display (for example, a touchscreen, an liquid crystal display (LCD), a cathode ray tube (CRT), holographic device, or a projector), a keyboard, or a click device (for example, a mouse, a trackball, a touchpad, or a touchscreen).

The memory 605 may include a read-only memory (ROM) and a random access memory (RAM), and provides an instruction and data to the processor 601. A part of the memory 605 may further include a non-volatile random access memory (NVRAM).

In some implementation manners, the memory 605 stores the following elements, and an executable module or a data structure, or a subset thereof, or an extension set thereof, an operating system, including various system programs, for example, a framework layer, a system runtime library layer, and a kernel layer that are shown in FIG. 3, which are used to implement various basic services and process hardware-based tasks, and an application program module, including various application programs, for example, a phone, information, a data connection, and an operating system switching interface that are shown in FIG. 3, which are used to implement various application services.

In this embodiment of the present disclosure, the processor 601 simultaneously runs multiple operating systems by invoking a program or an instruction stored in the memory 605. The multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal 600 by a foreground operating system is enabled or that use of hardware in the mobile terminal 600 by a background operating system is shielded, the hardware is hardware used for external interaction, a current foreground operating system is a first operating system, and the at least one background operating system includes a second operating system, and the processor 601 is configured to obtain an operating system switching instruction, where the operating system switching instruction includes an identifier of the second operating system and a switching identifier, and the identifier of the second operating system is used to instruct to switch the second operating system to the foreground operating system, release, according to the switching identifier, a hardware resource occupied by the first operating system, and modify running status information in a resource management namespace of the first operating system to a background state, modify running status information in a resource management namespace of the second operating system to a foreground state, and complete switching of the foreground operating system from the first operating system to the second operating system.

In the other approaches, a case in which multiple operating systems simultaneously use a same hardware resource frequently occurs, which causes abnormal use of the hardware resource. In comparison, according to a terminal provided in this embodiment of the present disclosure, when operating system hot-switching is performed, the mobile terminal 600 provided in this embodiment of the present disclosure may first release a hardware resource occupied by a current foreground operating system, and then instruct, using running status information in a resource management namespace, the hardware resource to shield access to the hardware resource by a background operating system, which ensures, to some extent, mutually exclusive access to and coordinated use of the hardware resource by multiple operating systems, thereby ensuring use reliability of the hardware resource after switching of an operating system.

Optionally, in an embodiment, the processor 601 is further configured to determine, from a global resource linked list, the resource management namespace of the second operating system according to the identifier of the second operating system, where the global resource linked list includes a correspondence between an identifier of an operating system and a resource management namespace of the operating system.

In this embodiment of the present disclosure, each resource management namespace corresponding to each operating system is maintained using the global resource linked list, which can speed up operating system hot-switching.

Optionally, in an embodiment, the processor 601 is further configured to unblock, according to the switching identifier, a blocking state of a switching start identifier in the blocking state to obtain an unblocked switching start identifier, where the unblocked switching start identifier is used to instruct a resource management thread to notify the hardware in the mobile terminal 600 to release the hardware resource occupied by the first operating system, and the switching start identifier in the blocking state is used to instruct to forbid execution of operating system switching.

In this embodiment of the present disclosure, the unblocked switching start identifier instructs to release the hardware resource, which improves hardware resource releasing efficiency.

Optionally, in an embodiment, after switching of the foreground operating system from the first operating system to the second operating system is completed, the processor 601 is further configured to allocate the hardware resource to the second operating system for use, and restore the unblocked switching start identifier to the blocking state after allocating the hardware resource to the second operating system for use.

In this embodiment of the present disclosure, after operating system switching is completed, the unblocked switching start identifier is restored to the blocking state in time. Therefore, mutually exclusive use of the hardware resource by the multiple operating systems is further improved.

Optionally, in an embodiment, the processor 601 is further configured to monitor a hot-swap interface of the mobile terminal 600 after switching of the foreground operating system from the first operating system to the second operating system is completed, and clear an in-position mark of the first hot-swap device from the resource management namespace of the first operating system in order to unbind a binding relationship between the first hot-swap device and the first operating system when a first hot-swap device is removed from the mobile terminal 600, where the in-position mark of the first hot-swap device is used to indicate that the first hot-swap device is used by the first operating system.

In this embodiment of the present disclosure, after a current operating system is switched, a binding relationship between a hot-swap device and an operating system before switching may be unbound in time, which ensures mutually exclusive use of the hot-swap device by the multiple operating systems.

Optionally, in an embodiment, the processor 601 is further configured to monitor the hot-swap interface of the mobile terminal 600 after switching of the foreground operating system from the first operating system to the second operating system is completed, and add an in-position mark of the second hot-swap device to the resource management namespace of the second operating system in order to establish a binding relationship between the second hot-swap device and the second operating system when a second hot-swap device is inserted into the mobile terminal 600, where the in-position mark of the second hot-swap device is used to indicate that the second hot-swap device is used by the second operating system.

In this embodiment of the present disclosure, after a current operating system is switched, a binding relationship between a hot-swap device and an operating system after switching may be established. Therefore, mutually exclusive use of the hot-swap device by the multiple operating systems is ensured.

In addition, the mobile terminal 600 may further execute methods and embodiments in FIG. 1 to FIG. 6. Details are not described herein again in this embodiment of the present disclosure.

When operating system hot-switching is performed, the mobile terminal 600 provided in this embodiment of the present disclosure may first release a hardware resource occupied by a current foreground operating system, and then instruct, using running status information in a resource management namespace, the hardware resource to shield access to the hardware resource by a background operating system, which ensures, to some extent, mutually exclusive access to and coordinated use of the hardware resource by multiple operating systems, thereby ensuring use reliability of the hardware resource after switching of an operating system.

In addition, the mobile terminal provided in this embodiment of the present disclosure is connected to a hot-swap device using a hot-swap interface. The processor 601 simultaneously runs multiple operating systems, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal 600 by a foreground operating system is enabled or that use of hardware in the mobile terminal 600 by a background operating system is shielded, the hardware is hardware used for external interaction, a current foreground operating system is a first operating system, the at least one background operating system includes a second operating system, and the processor 601 is configured to monitor the hot-swap interface of the mobile terminal 600, add an in-position mark of the first hot-swap device to a resource management namespace of the first operating system in order to establish a binding relationship between the first hot-swap device and the first operating system when a first hot-swap device is inserted into the mobile terminal 600, where the in-position mark of the first hot-swap device is used to indicate that the first hot-swap device is used by the first operating system, and clear an in-position mark of the second hot-swap device from the resource management namespace of the first operating system in order to unbind a binding relationship between the second hot-swap device and the first operating system when a second hot-swap device is removed from the mobile terminal 600, where the in-position mark of the second hot-swap device is used to indicate that the second hot-swap device is used by the first operating system.

Optionally, in an embodiment, the processor 601 is further configured to clear the in-position mark of the first hot-swap device from the resource management namespace of the first operating system in order to unbind the binding relationship between the first hot-swap device and the first operating system after the foreground operating system is switched from the first operating system to the second operating system, and when the first hot-swap device is removed from the mobile terminal 600, where the in-position mark of the first hot-swap device is used to indicate that the first hot-swap device is used by the first operating system, and add the in-position mark of the second hot-swap device to a resource management namespace of the second operating system in order to establish a binding relationship between the second hot-swap device and the second operating system when the second hot-swap device is inserted into the mobile terminal 600, where the in-position mark of the second hot-swap device is used to indicate that the second hot-swap device is used by the second operating system.

The mobile terminal 600 provided in this embodiment of the present disclosure may bind a hot-swap device to a current operating system or unbind a hot-swap device from a current operating system in order to avoid a conflict in use of the hot-swap device by multiple operating systems, thereby ensuring mutually exclusive use of the hot-swap device by the multiple operating systems.

Figure 15:
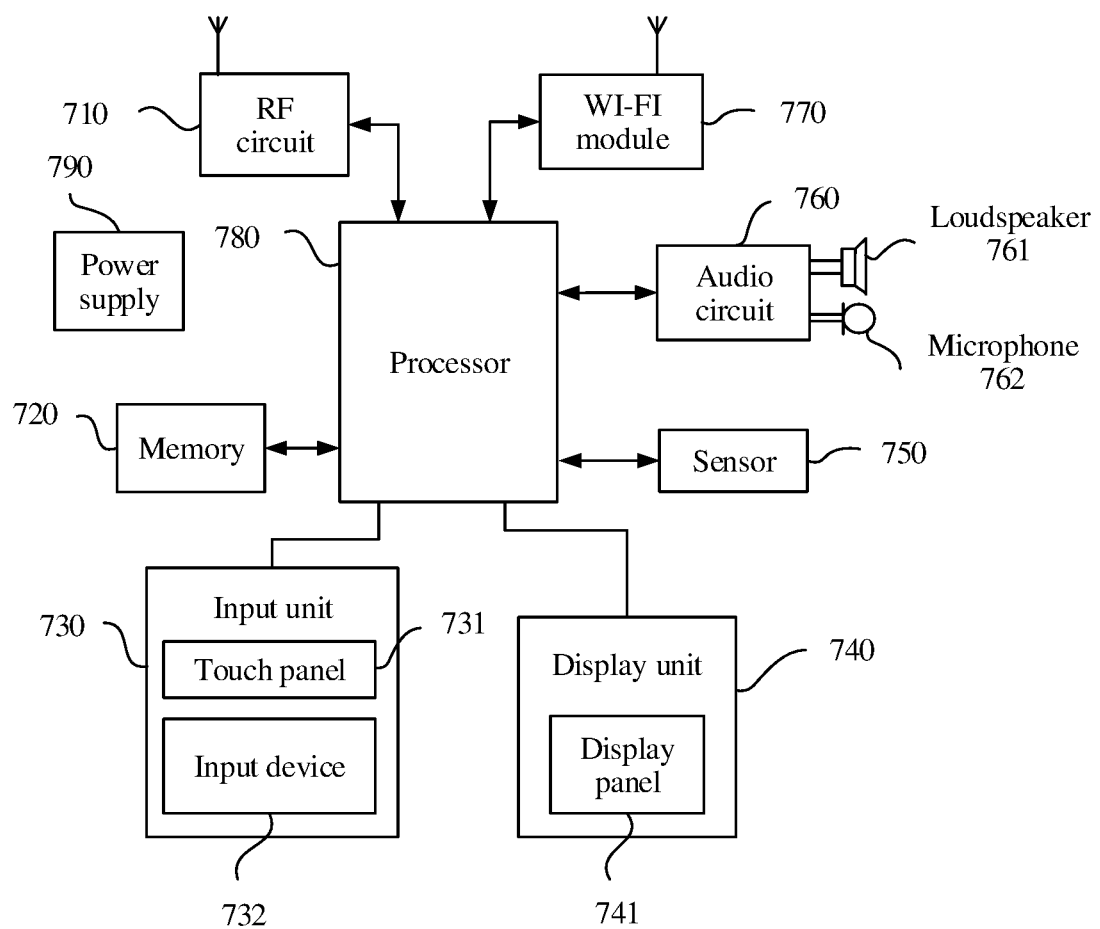
FIG. 15 is another schematic embodiment diagram of a mobile terminal according to an embodiment of the present disclosure.

FIG. 15 shows a block diagram of a part of structure of a mobile terminal according to an embodiment of the present disclosure. Referring to FIG. 15, the mobile terminal includes parts such as a radio frequency (RF) circuit 710, a memory 720, an input unit 730, a display unit 740, a sensor 750, an audio circuit 760, a WI-FI module 770, a processor 780, and a power supply 790. A person skilled in the art may understand that the structure of the mobile terminal shown in FIG. 15 constitutes no limitation on the mobile terminal, and may include more or fewer parts than those shown in the figure, or combine some parts, or have a different part arrangement.

The following describes the composition parts of the mobile terminal in detail with reference to FIG. 15.

The RF circuit 710 may be configured to receive and send a signal in an information receiving or sending process or a call process, particularly, after receiving downlink information of a base station, send the downlink information to the processor 780 for processing, and send designed uplink data to the base station. Generally, the RF circuit 710 includes but is not limited to an antenna, at least one amplifier, a transceiver, a coupler, a low noise amplifier (LNA), a duplexer, and the like. In addition, the RF circuit 710 may further communicate with a network and another device by means of wireless communications. The foregoing wireless communications may use any communications standard or protocol, which includes but is not limited to a global system for mobile communications (GSM), a general packet radio service (GPRS), Code Division Multiple Access (CDMA), Wideband Code Division Multiple Access (WCDMA), Long Term Evolution (LTE), an electronic mail (e-mail), a short message service (SMS), and the like.

The memory 720 may be configured to store a software program and a module. The processor 780 performs various function applications of the mobile terminal and data processing by running the software program and module that are stored in the memory 720. The memory 720 may mainly include a program storage area and a data storage area. The program storage area may store an operating system, an application program required by at least one function (such as a sound playing function or an image playing function), and the like. The data storage area may store data (such as audio data or a phone book) created according to use of the mobile terminal, and the like. In addition, the memory 720 may include a high-speed RAM, or may further include a non-volatile memory such as at least one magnetic disk storage component, a flash device, or another volatile solid-state storage device.

The input unit 730 may be configured to receive digit or character information that is input, and generate key signal input related to user setting and function control of the mobile terminal. Further, the input unit 730 may include a touch panel 731 and an input device 732. The touch panel 731, which is also referred to as a touchscreen, may collect a touch operation (such as an operation performed on the touch panel 731 or near the touch panel 731 by a user using a finger or any proper object or accessory such as a stylus) performed on the touch panel 731 or near the touch panel 731 by the user, and drive a corresponding connection apparatus according to a preset program. Optionally, the touch panel 731 may include two parts, a touch detection apparatus and a touch controller. The touch detection apparatus detects a touch direction of the user, detects a signal generated by the touch operation, and transfers the signal to the touch controller. The touch controller receives touch information from the touch detection apparatus, converts the touch information into touch point coordinates, then transfers the touch point coordinates to the processor 780, and can receive and execute a command sent by the processor 780. In addition, the touch panel 731 may be implemented in multiple types, such as a resistive type, a capacitive type, an infrared ray, and a surface acoustic wave. In addition to the touch panel 731, the input unit 730 may further includeaninput device 732. Further, the input device 732 may include but is not limited to one or more of a physical keyboard, a function key (such as a volume control key or an on/off key), a trackball, a mouse, a joystick, or the like.

The display unit 740 may be configured to display information entered by the user or information provided for the user, and various menus of the mobile terminal. The display unit 740 may include a display panel 741. Optionally, the display panel 741 may be configured in a form such as a LCD and an organic light-emitting diode (OLED). Further, the touch panel 731 may cover the display panel 741. After detecting a touch operation on the touch panel 731 or near the touch panel 731, the touch panel 731 transfers the touch operation to the processor 780 to determine a touch event type. Subsequently, the processor 780 provides corresponding visual output on the display panel 741 according to the touch event type. In FIG. 15, although the touch panel 731 and the display panel 741 are used as two independent parts to implement input and output functions of the mobile terminal, in some embodiments, the touch panel 731 and the display panel 741 may be integrated to implement the input and output functions of the mobile terminal.

The mobile terminal may further include at least one sensor 750 such as an optical sensor, a motion sensor, or another sensor. Further, the optical sensor may include an ambient light sensor and a proximity sensor. The ambient light sensor may adjust luminance of the display panel 741 according to brightness of ambient light. The proximity sensor may turn off the display panel 741 and/or backlight when the mobile terminal is moved to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. For other sensors such as a gyroscope, a barometer, a hygrometer, a thermometer, and an infrared sensor that may also be configured on the mobile terminal, details are not described herein.

The audio circuit 760, a loudspeaker 761, and a microphone 762 may provide an audio interface between the user and the mobile terminal. The audio circuit 760 may transmit, to the loudspeaker 761, a received electrical signal converted from audio data, and the loudspeaker 761 converts the electrical signal into a sound signal for output. On the other hand, the microphone 762 converts a collected sound signal into an electrical signal. The audio circuit 760 receives and converts the electrical signal, and then outputs the audio data to the processor 780 for processing. The processor 780 sends processed audio data to, for example, another mobile terminal using the RF circuit 710, or outputs the audio data to the memory 720 for further processing.

WI-FI belongs to a short-distance wireless transmission technology. The mobile terminal may help, using the WI-FI module 770, the user to receive and send an email, browse a web page, access streaming media, and the like. The WI-FI module 770 provides wireless broadband Internet access for the user. Although the WI-FI module 770 is shown in FIG. 15, it may be understood that the WI-FI module 770 is not a mandatory composition of the mobile terminal, and may be totally omitted according to a requirement without changing the essence of the present disclosure.

The processor 780 is a control center of the mobile terminal and is connected to all the parts of the entire mobile terminal using various interfaces and lines, and performs various functions of the mobile terminal and data processing by running or executing the software program and/or module that are/is stored in the memory 720 and by invoking data stored in the memory 720 in order to perform overall monitoring on the mobile terminal. Optionally, the processor 780 may include one or more processing units. Preferably, an application processor and a modem processor may be integrated into the processor 780. The application processor mainly processes an operating system, a user interface, an application program, and the like. The modem processor mainly processes wireless communications. It may be understood that the foregoing modem processor may not be integrated in the processor 780.

The mobile terminal further includes the power supply 790 (such as a battery) that provides power to all the parts. Preferably, the power supply may be logically connected to the processor 780 using a power management system in order to implement functions such as charging and discharging management and power consumption management using the power management system.

Although not shown, a camera, a BLUETOOTH module, and the like may further be included in the mobile terminal, and details are not described herein.

The processor 780 provided in this embodiment of the present disclosure simultaneously runs multiple operating systems. The multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, and the at least one background operating system includes a second operating system, and the processor 780 is configured to obtain an operating system switching instruction, where the operating system switching instruction includes an identifier of the second operating system and a switching identifier, and the identifier of the second operating system is used to instruct to switch the second operating system to the foreground operating system, release, according to the switching identifier, a hardware resource occupied by the first operating system, modify running status information in a resource management namespace of the first operating system to a background state, modify running status information in a resource management namespace of the second operating system to a foreground state, and complete switching of the foreground operating system from the first operating system to the second operating system.

In the other approaches, a case in which multiple operating systems simultaneously use a same hardware resource frequently occurs, which causes abnormal use of the hardware resource. In comparison, according to a terminal provided in this embodiment of the present disclosure, when operating system hot-switching is performed, the mobile terminal provided in this embodiment of the present disclosure may first release a hardware resource occupied by a current foreground operating system, and then instruct, using running status information in a resource management namespace, the hardware resource to shield access to the hardware resource by a background operating system, which ensures, to some extent, mutually exclusive access to and coordinated use of the hardware resource by multiple operating systems, thereby ensuring use reliability of the hardware resource after switching of an operating system.

Optionally, in an embodiment, the processor 780 is further configured to determine, from a global resource linked list, the resource management namespace of the second operating system according to the identifier of the second operating system, where the global resource linked list includes a correspondence between an identifier of an operating system and a resource management namespace of the operating system.

In this embodiment of the present disclosure, each resource management namespace corresponding to each operating system is maintained using the global resource linked list, which can speed up operating system hot-switching.

Optionally, in an embodiment, the processor 780 is further configured to unblock, according to the switching identifier, a blocking state of a switching start identifier in the blocking state to obtain an unblocked switching start identifier, where the unblocked switching start identifier is used to instruct a resource management thread to notify the hardware in the mobile terminal to release the hardware resource occupied by the first operating system, and the switching start identifier in the blocking state is used to instruct to forbid execution of operating system switching.

In this embodiment of the present disclosure, the unblocked switching start identifier instructs to release the hardware resource, which improves hardware resource releasing efficiency.

Optionally, in an embodiment, the processor 780 is further configured to allocate the hardware resource to the second operating system for use after switching of the foreground operating system from the first operating system to the second operating system is completed, and restore the unblocked switching start identifier to the blocking state after allocating the hardware resource to the second operating system for use.

In this embodiment of the present disclosure, after operating system switching is completed, the unblocked switching start identifier is restored to the blocking state in time. Therefore, mutually exclusive use of the hardware resource by the multiple operating systems is further improved.

Optionally, in an embodiment, the processor 780 is further configured to monitor a hot-swap interface of the mobile terminal after switching of the foreground operating system from the first operating system to the second operating system is completed, and clear an in-position mark of the first hot-swap device from the resource management namespace of the first operating system in order to unbind a binding relationship between the first hot-swap device and the first operating system when a first hot-swap device is removed from the mobile terminal, where the in-position mark of the first hot-swap device is used to indicate that the first hot-swap device is used by the first operating system.

In this embodiment of the present disclosure, after a current operating system is switched, a binding relationship between a hot-swap device and an operating system before switching may be unbound in time, which ensures mutually exclusive use of the hot-swap device by the multiple operating systems.

Optionally, in an embodiment, the processor 780 is further configured to monitor the hot-swap interface of the mobile terminal after switching of the foreground operating system from the first operating system to the second operating system is completed, and add an in-position mark of the second hot-swap device to the resource management namespace of the second operating system in order to establish a binding relationship between the second hot-swap device and the second operating system when a second hot-swap device is inserted into the mobile terminal, where the in-position mark of the second hot-swap device is used to indicate that the second hot-swap device is used by the second operating system.

In this embodiment of the present disclosure, after a current operating system is switched, a binding relationship between a hot-swap device and an operating system after switching may be established. Therefore, mutually exclusive use of the hot-swap device by the multiple operating systems is ensured.

In addition, the mobile terminal may further execute methods and embodiments in FIG. 1 to FIG. 6. Details are not described herein again in this embodiment of the present disclosure.

When operating system hot-switching is performed, the mobile terminal provided in this embodiment of the present disclosure may first release a hardware resource occupied by a current foreground operating system, and then instruct, using running status information in a resource management namespace, the hardware resource to shield access to the hardware resource by a background operating system, which ensures, to some extent, mutually exclusive access to and coordinated use of the hardware resource by multiple operating systems, thereby ensuring use reliability of the hardware resource after switching of an operating system.

In addition, the mobile terminal provided in this embodiment of the present disclosure is connected to a hot-swap device using a hot-swap interface. The processor 780 simultaneously runs multiple operating systems, the multiple operating systems include one foreground operating system and at least one background operating system, each operating system is corresponding to a resource management namespace, each resource management namespace includes running status information of an operating system corresponding to the resource management namespace, the running status information is used to indicate whether the operating system is a foreground operating system or a background operating system, and is used to indicate that use of hardware in the mobile terminal by a foreground operating system is enabled or that use of hardware in the mobile terminal by a background operating system is shielded, the hardware is hardware used for external interaction, a current foreground operating system is a first operating system, the at least one background operating system includes a second operating system, and the processor 780 is configured to monitor the hot-swap interface of the mobile terminal, add an in-position mark of the first hot-swap device to a resource management namespace of the first operating system in order to establish a binding relationship between the first hot-swap device and the first operating system when a first hot-swap device is inserted into the mobile terminal, where the in-position mark of the first hot-swap device is used to indicate that the first hot-swap device is used by the first operating system, and clear an in-position mark of the second hot-swap device from the resource management namespace of the first operating system in order to unbind a binding relationship between the second hot-swap device and the first operating system when a second hot-swap device is removed from the mobile terminal, where the in-position mark of the second hot-swap device is used to indicate that the second hot-swap device is used by the first operating system.

Optionally, in an embodiment, the processor 780 is further configured to clear the in-position mark of the first hot-swap device from the resource management namespace of the first operating system in order to unbind the binding relationship between the first hot-swap device and the first operating system after the foreground operating system is switched from the first operating system to the second operating system, and when the first hot-swap device is removed from the mobile terminal, where the in-position mark of the first hot-swap device is used to indicate that the first hot-swap device is used by the first operating system, and add the in-position mark of the second hot-swap device to a resource management namespace of the second operating system in order to establish a binding relationship between the second hot-swap device and the second operating system when the second hot-swap device is inserted into the mobile terminal, where the in-position mark of the second hot-swap device is used to indicate that the second hot-swap device is used by the second operating system.

The mobile terminal provided in this embodiment of the present disclosure may bind a hot-swap device to a current operating system or unbind a hot-swap device from a current operating system in order to avoid a conflict in use of the hot-swap device by multiple operating systems, thereby ensuring mutually exclusive use of the hot-swap device by the multiple operating systems.

A person of ordinary skill in the art may understand that all or some of the steps of the methods in the foregoing embodiments may be implemented by a program instructing relevant hardware (such as a processor). The program may be stored in a computer readable storage medium. The storage medium may include a ROM, a RAM, a magnetic disk, or an optical disc.

The operating system hot-switching method and apparatus and a mobile terminal provided in the embodiments of the present disclosure are described in detail above. Principles and implementation manners of the present disclosure are described in this specification using specific examples. The descriptions about the foregoing embodiments are merely provided to help understand the method and core ideas of the present disclosure. In addition, a person of ordinary skill in the art can make modifications to a specific implementation and an application scope according to the ideas of the present disclosure. In conclusion, the content of this specification shall not be construed as a limitation on the present disclosure.

What is claimed is:

1. An operating system hot-switching method applied to a mobile terminal, wherein the method comprises:

providing a plurality of operating systems including a foreground operating system and at least one background operating system, wherein each of the plurality of operating systems corresponds to a resource management namespace that comprises running status information of an operating system corresponding to the resource management namespace, wherein the corresponding running status information indicates whether the operating system corresponding to the resource management namespace is the foreground operating system or the at least one background operating system, wherein use of a hardware resource for the foreground operating system is enabled and use of the hardware resource for each of the at least one background operating system is disabled, wherein the mobile terminal comprises the hardware resource;

operating a current foreground operating system as a first operating system and operating the at least one background operating system as a second operating system;

obtaining an operating system switching instruction, wherein the operating system switching instruction comprises an identifier of the second operating system and a switching identifier, wherein the identifier of the second operating system is used to switch the second operating system to the current foreground operating system and the switching identifier is used to unblock a switching start identifier according to the operating system switching instruction that causes the hardware resource occupied by the first operating system to be released;

releasing by a resource management thread, according to the switching identifier, the hardware resource occupied by the first operating system, wherein the releasing comprises unblocking, according to the switching identifier, a blocking state of a switching start identifier to an unblocking state of the switching start identifier, wherein the switching start identifier in the unblocking state instructs the resource management thread to notify the hardware in the mobile terminal to release the hardware resource occupied by the first operating system, and wherein the switching start identifier instructs the resource management thread to prevent execution of operating system switching, wherein the hardware resource is used for external interaction;

modifying running status information in a resource management namespace of the first operating system to a background state;

modifying running status information in a resource management namespace of the second operating system to a foreground state; and switching the current foreground operating system from the first operating system to the second operating system;

allocating the hardware resource to the second operating system for use; and restoring the switching start identifier in the unblocking state to the blocking state after allocating the hardware resource to the second operating system for use.

2. The operating system hot-switching method of claim 1, wherein after releasing the hardware resource occupied by the first operating system, the method further comprises determining, from a global resource linked list, the resource management namespace of the second operating system according to the identifier of the second operating system, wherein the global resource linked list comprises a correspondence between an identifier of an operating system and a resource management namespace of the operating system.

3. A mobile terminal, comprising:

a processor;

a memory coupled to the processor; and a hardware resource coupled to the memory and the processor, wherein the processor is configured to:

simultaneously run a plurality of operating systems, wherein the plurality of operating systems comprise a foreground operating system and at least one background operating system, wherein each of the plurality of operating systems corresponds to a resource management namespace that comprises running status information of an operating system corresponding to the resource management namespace, wherein the corresponding running status information indicates whether the operating system corresponding to the resource management namespace is the foreground operating system or the at least one background operating system, wherein use of a hardware resource for the foreground operating system is enabled and use of the hardware resource for each of the at least one background operating system is disabled, wherein each of the plurality of operating systems comprise the hardware resource;

operate a current foreground operating system as a first operating system and operating the at least one background operating system as a second operating system;

obtain an operating system switching instruction, wherein the operating system switching instruction comprises an identifier of the second operating system and a switching identifier, wherein the identifier of the second operating system is used to switch the second operating system to the current foreground operating system and the switching identifier is used to unblock a switching start identifier according to the operating system switching instruction that causes the hardware resource occupied by the first operating system to be released;

release, by a resource management thread according to the switching identifier, the hardware resource occupied by the first operating system, wherein the processor is configured to unblock, according to the switching identifier, a blocking state of a switching start identifier to an unblocking state of the switching start identifier, wherein the switching start identifier in the unblocking state instructs the resource management thread to notify hardware in the mobile terminal to release the hardware resource occupied by the first operating system, and wherein the switching start identifier in the blocking state instructs the resource management thread to prevent execution of operating system switching;

modify running status information in a resource management namespace of the first operating system to a background state;

modify running status information in a resource management namespace of the second operating system to a foreground state;

switch the current foreground operating system from the first operating system to the second operating system;

allocate the hardware resource to the second operating system for use; and restore the switching start identifier in the unblocking state to the blocking state after allocating the hardware resource to the second operating system for use.

4. The mobile terminal of claim 3, wherein the processor is further configured to determine, from a global resource linked list, the resource management namespace of the second operating system according to the identifier of the second operating system, wherein the global resource linked list comprises a correspondence between an identifier of an operating system and a resource management namespace of the operating system.

5. A non-transitory computer-readable storage medium comprising instructions executed by a computer, causing the computer to:

provide a plurality of operating systems including a foreground operating system and at least one background operating system, wherein each of the plurality of operating systems corresponds to a resource management namespace that comprises running status information of an operating system corresponding to the resource management namespace, wherein the corresponding running status information indicates whether the operating system corresponding to the resource management namespace is the foreground operating system or the at least one background operating system, wherein use of a hardware resource for the foreground operating system is enabled and use of the hardware resource for each of the at least one background operating system is disabled, wherein the mobile terminal comprises the hardware resource;

operate a current foreground operating system as a first operating system and operate at least one background operating system as a second operating system, wherein use of a hardware resource for the foreground operating system is enabled and use of a hardware resource for the at least one background operating system is disabled;

obtain an operating system switching instruction, wherein the operating system switching instruction comprises an identifier of the second operating system and a switching identifier, wherein the identifier of the second operating system is used to switch the second operating system to the current foreground operating system and the switching identifier is used to unblock a switching start identifier according to the operating system switching instruction that causes the hardware resource occupied by the first operating system to be released;

release, by a resource management thread, the hardware resource occupied by a first operating system, wherein the hardware resource is a hardware resource is used for external interaction, wherein the computer is configured to unblock, according to the switching identifier, a blocking state of the switching start identifier to an unblocking state of the switching start identifier, wherein the switching start identifier in the unblocking state instructs the resource management thread to permit releasing the hardware resource occupied by the first operating system, wherein the switching start identifier in the blocking state instructs the resource management thread to prevent releasing the hardware resource occupied by the first operating system, wherein the resource management thread is associated with the hardware resource;

modify running status information in a resource management namespace of the first operating system to a background state; and modify running status information in a resource management namespace of the second operating system to a foreground state;

switch the current foreground operating system from the first operating system to the second operating system;

allocate the hardware resource to the second operating system for use; and restore the switching start identifier in the unblocking state to the blocking state after allocating the hardware resource to the second operating system for use.

* * * * *